United States Patent
Khwaja et al.

(10) Patent No.: US 12,481,965 B2
(45) Date of Patent: *Nov. 25, 2025

(54) SYSTEMS AND METHODS FOR CALENDAR SHARING BY ENTERPRISE WEB APPLICATIONS

(71) Applicant: Nasdaq, Inc., New York, NY (US)

(72) Inventors: Anis A. Khwaja, Huntington, NY (US); Dean Oligino, New York, NY (US)

(73) Assignee: NASDAQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,064

(22) Filed: Jun. 25, 2024

(65) Prior Publication Data
US 2024/0346455 A1 Oct. 17, 2024

Related U.S. Application Data

(63) Continuation of application No. 18/210,853, filed on Jun. 16, 2023, now Pat. No. 12,056,668, which is a continuation of application No. 17/854,566, filed on Jun. 30, 2022, now Pat. No. 11,699,134, which is a continuation of application No. 16/889,097, filed on Jun. 1, 2020, now Pat. No. 11,392,901, which is a continuation of application No. 15/842,480, filed on Dec. 14, 2017, now Pat. No. 10,685,330.

(60) Provisional application No. 62/435,532, filed on Dec. 16, 2016.

(51) Int. Cl.
G06Q 10/1093 (2023.01)
G06F 16/95 (2019.01)
H04L 67/10 (2022.01)
H04L 67/02 (2022.01)

(52) U.S. Cl.
CPC ........ *G06Q 10/1093* (2013.01); *G06F 16/95* (2019.01); *H04L 67/10* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 5,727,202 A | 3/1998 | Kucala | |
| 6,243,705 B1 | 6/2001 | Kucala | |
| 7,356,694 B2 | 4/2008 | Mayo | |
| 7,519,916 B1 | 4/2009 | Hartwell | |

(Continued)

OTHER PUBLICATIONS

International Search Report and the Written Opinion of related Application No. PCT/US17/66572 mail Mar. 7, 2018.

(Continued)

*Primary Examiner* — Quang N Nguyen
(74) *Attorney, Agent, or Firm* — Nixon & Vanderhye, PC

(57) ABSTRACT

The described technology relates to integrating events electronically scheduled in enterprise web applications and other event applications. A capability is provided for events created by an enterprise web application and events from other external event streams to be presented in a consolidated calendar in the enterprise web application. Capabilities are also provided for sharing the calendar among enterprise users and non-enterprise users, and for efficiently generating the shared calendar.

20 Claims, 13 Drawing Sheets

(56) References Cited

U.S. PATENT DOCUMENTS

| | | | |
|---|---|---|---|
| 7,668,900 | B2 | 2/2010 | Fishman |
| 8,655,691 | B2 | 2/2014 | Van Os |
| 8,856,869 | B1 | 10/2014 | Brinskelle |
| 9,015,281 | B2 | 4/2015 | Moffat |
| 9,141,483 | B1 | 9/2015 | Sekar et al. |
| 10,392,542 | B2 * | 8/2019 | Schmatloch ....... C08G 18/2063 |
| 10,542,114 | B2 | 1/2020 | Cunico |
| 10,607,193 | B1 | 3/2020 | Wender |
| 10,893,139 | B1 | 1/2021 | Gautam |
| 10,915,868 | B2 * | 2/2021 | Ayres .................. G06Q 10/109 |
| 11,144,887 | B2 | 10/2021 | Wender |
| 2006/0265489 | A1 | 11/2006 | Moore |
| 2007/0250784 | A1 | 10/2007 | Riley et al. |
| 2007/0282907 | A1 * | 12/2007 | Chambers ............. G06F 16/487 |
| 2008/0046437 | A1 | 2/2008 | Wood |
| 2008/0046471 | A1 | 2/2008 | Moore et al. |
| 2008/0168526 | A1 | 7/2008 | Robbin et al. |
| 2009/0019383 | A1 | 1/2009 | Riley et al. |
| 2009/0228322 | A1 | 9/2009 | Van Os |
| 2011/0269424 | A1 | 11/2011 | Multer et al. |
| 2011/0289106 | A1 | 11/2011 | Rankin |
| 2012/0036208 | A1 | 2/2012 | Beisel |
| 2012/0124372 | A1 | 5/2012 | Dilley |
| 2012/0179909 | A1 | 7/2012 | Sagi et al. |
| 2013/0061035 | A1 | 3/2013 | Hook |
| 2013/0305160 | A1 | 11/2013 | Gingras |
| 2014/0026179 | A1 | 1/2014 | Devarajan |
| 2014/0075284 | A1 | 3/2014 | Logtenberg |
| 2014/0157177 | A1 | 6/2014 | Ghadge |
| 2014/0225897 | A1 | 8/2014 | Sarrazin |
| 2015/0149452 | A1 | 5/2015 | Warner |
| 2016/0212210 | A1 | 7/2016 | Picciallo |
| 2016/0253628 | A1 | 9/2016 | Uretzky et al. |
| 2016/0314132 | A1 | 10/2016 | Lineberger et al. |
| 2017/0147987 | A1 | 5/2017 | Borsum |
| 2018/0285465 | A1 | 10/2018 | Schaffernoth |
| 2018/0357609 | A1 | 12/2018 | Hwacinski |
| 2021/0256480 | A1 * | 8/2021 | Everton .............. H04L 67/1095 |
| 2022/0180009 | A1 | 6/2022 | Remezov |
| 2022/0181009 | A1 * | 6/2022 | Nagasawa ............ G06Q 10/083 |

OTHER PUBLICATIONS

International Preliminary Report on Patentability issued in PCT Application No. PCT/US2017/066572 mailed May 10, 2019, 13 pages.

Automated discovery, interaction and composition of semantic web services; K Sycara, M. Paolucci, A Ankolekar, . . . Web Semantics; Science . . . , 2003—Elsevier (Year 2003).

A framework for adaptive rdf graph replication for mobile semantic web applications, B. Schandl, S. Zander—2009—eprints.cs.univie.ac.at (Year 2009).

The GAMBAS middleware and SDK for smart city applications; W. Apolinarski, U Iqbal . . . —2014 IEEE International . . . , 2014—ieeexplore.ieee.org (Year 2014).

* cited by examiner

| | |
|---|---|
| Past Meetings | Don't Sync ▼ |
| Future Meetings | Next 6 Months ▼ |
| Restrict meetings to specific participants | ON ● — Select Corporate Participants ▼ |
| Include My StreetEvents | ○ OFF |
| Include My Peer StreetEvents | ○ OFF — Select Peer List ▼ — Select Event Types ▼ |

FIG. 5

New ICS Subscriber

1
Email: anis_khwaja@nasdaq.com  Require Password  ○ OFF  EMAIL
URL: webcals://1234hea13431/13492adwgwz  DELETE 2
URL: Enter Email  Require Password  ON ●  EMAIL
Password: Enter Password  Verify: Require Password  DELETE
URL:

FIG. 6

SYSTEMS AND METHODS FOR CALENDAR SHARING BY ENTERPRISE WEB APPLICATIONS

CROSS-REFERENCE TO RELATED APPLICATIONS

This application is a continuation of U.S. patent application Ser. No. 18/210,853, filed Jun. 16, 2023, now U.S. Pat. No. 12,056,668, issued on Aug. 8, 2024, which is a continuation of U.S. patent application Ser. No. 17/854,566, filed Jun. 30, 2022, now U.S. Pat. No. 11,699,134, issued on Jul. 11, 2023, which is a continuation of U.S. patent application Ser. No. 16/889,097, filed Jun. 1, 2020, now U.S. Pat. No. 11,392,901, issued on Jul. 19, 2022, which is a continuation of U.S. patent application Ser. No. 15/842,480 filed Dec. 14, 2017, now U.S. Pat. No. 10,685,330, issued Jun. 16, 2020, which claims the benefit of priority to U.S. Provisional Application No. 62/435,532 filed on Dec. 16, 2016, the entire contents of which are herein incorporated by reference.

TECHNICAL OVERVIEW

The technology described herein relates to electronic scheduling of events. More particularly, the technology described herein relates to synchronizing electronic schedules over multiple platforms types.

BACKGROUND

A corporation may deploy an enterprise software application ("web application") on one or more servers in its corporate network or other Internet-accessible computer, and enable all its employees and/or clients to access that application via the web. Web-accessibility of such applications provide employees and/or clients with the capability to access the application at any time and from anyplace having network connectivity.

Many enterprise web applications have their own requirements for organized events (e.g., internal meetings, client meetings, product/service demonstrations, etc.) requiring coordination between users of the web application. Thus, each such enterprise web application may have its own scheduled event configurations and/or event participant configurations.

It is also the case that many enterprise web application users use other event application clients, in addition to enterprise software applications discussed above. For example, event application clients such as Microsoft Outlook™ is used by numerous enterprises for email, event management (e.g., calendar management) and other functions such as contacts management.

Aspects of these separate event applications can be synergistically integrated with aspects of the enterprise web application in a manner that improves the capabilities of both. Thus, techniques are desired for integrating enterprise web applications and their event management components with other event management systems used by users in a corporation.

SUMMARY

The described technology relates to integrating scheduled event functions in enterprise web applications and other event scheduling applications, and sharing such event information from multiple sources with other event client applications. The described technology provides a capability to improve the efficiency and accuracy by which events such as meetings are organized and conducted in a corporation. In some example embodiments, an improved capability is provided for an event application like, for example, Microsoft's Outlook™ or Google Calendar™ to provide the user with shared information regarding events from the enterprise web application and event information from other sources shared by the enterprise application in a consolidated calendar. According to some example embodiments, improved capabilities are provided to the enterprise web application clients (e.g., Nasdaq's IR Insight™) based upon capabilities to control the events to be shared.

This summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 5 is an example user interface for specifying some configuration settings, in accordance with some example embodiments;

FIG. 6 is an example user interface for specifying subscribers associated with an event, according to some example embodiments;

DETAILED DESCRIPTION

Figure 1:
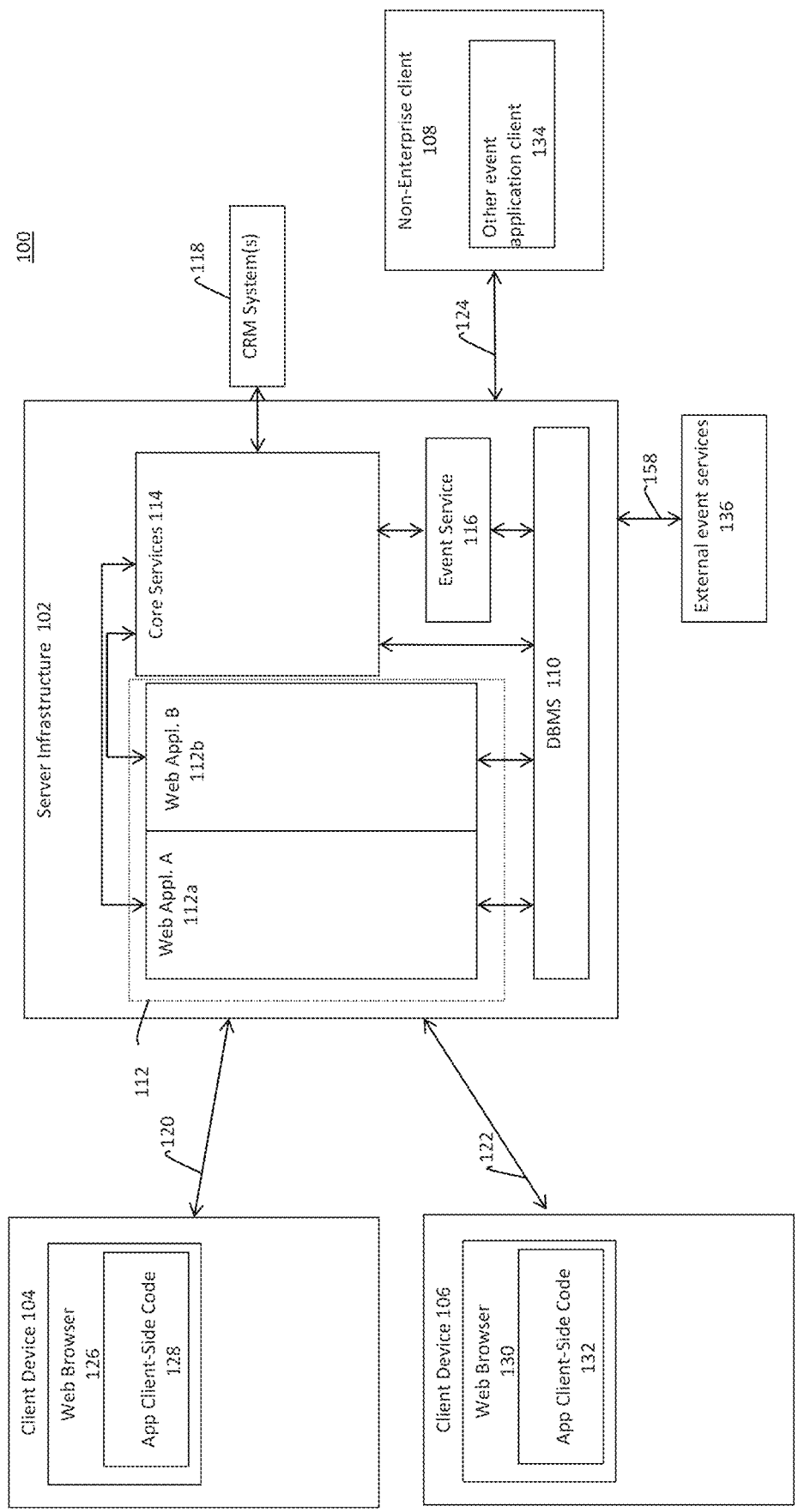
FIG. 1 illustrates a computing environment having one or more server devices executing web applications server components, and client devices at least some of which execute a web application client component to access event scheduling operations in the web application, and other user devices that access event information in the server devices using other event clients, according to some example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

The technology described herein relates to, among other subjects, integrating organized event related functions in enterprise web applications with other event management applications. The described technology may improve the efficiency and accuracy by which organized and/or scheduled events such as, but not limited to, meetings are organized, conducted and followed-up in an enterprise. In some example embodiments, an improved capability is provided for enterprise web applications that have an integrated event management capability to interact with other event management applications that are used in and out of the enterprise environment. For example, some embodiments enable the management of events created in an enterprise web application, such as, for example, Nasdaq's IR Insight™, that among many other functions also has an integrated event management function to cooperate with other enterprise or non-enterprise event management applications, such as, for example, Microsoft's Outlook™, Google Calendar™, and the like. Example embodiments provide for enterprise and non-enterprise users to access event information created in the enterprise web application and/or shared by the enterprise web application in an efficient, controllable, lower overhead manner.

Example embodiments may be used to ensure that the privacy and security controls of the enterprise web application are adhered to even while enabling some event information to be accessed by non-enterprise users. For example, whereas registered users of the enterprise web application can display enterprise-only events as well as other events in a single integrated calendar, users who are not registered as enterprise users are able to access only the other events which are open to access by non-enterprise users. Certain example embodiments improve the efficiency of the enterprise web application by creating an integrated calendar showing both enterprise-only events and other events on the same calendar, making it unnecessary for enterprise users to access multiple applications to access the different types of events. Embodiments also improve the overall efficiency of access to event data on individual computers accessed by users and also improves the overall availability of event information in the enterprise system by enabling access to the event information from outside the enterprise web application and from different client applications.

Thus, embodiments of the present invention provide techniques for addressing a problem caused by having multiple applications by which events are electronically scheduled where the information regarding the scheduled events may have different access control requirements. With highly connected corporations of today where each employee may interact with multiple event management applications, embodiments provide for efficiently synchronizing and integrating the information related to scheduled events so that a user can get a better view of his scheduled commitments when the user is logged-in to the enterprise web application, as well as times when the user is not logged-in to the enterprise web application. Moreover, according to example embodiments, users can controllably share scheduled information with other users in or out of the enterprise system environment.

Figure 2:
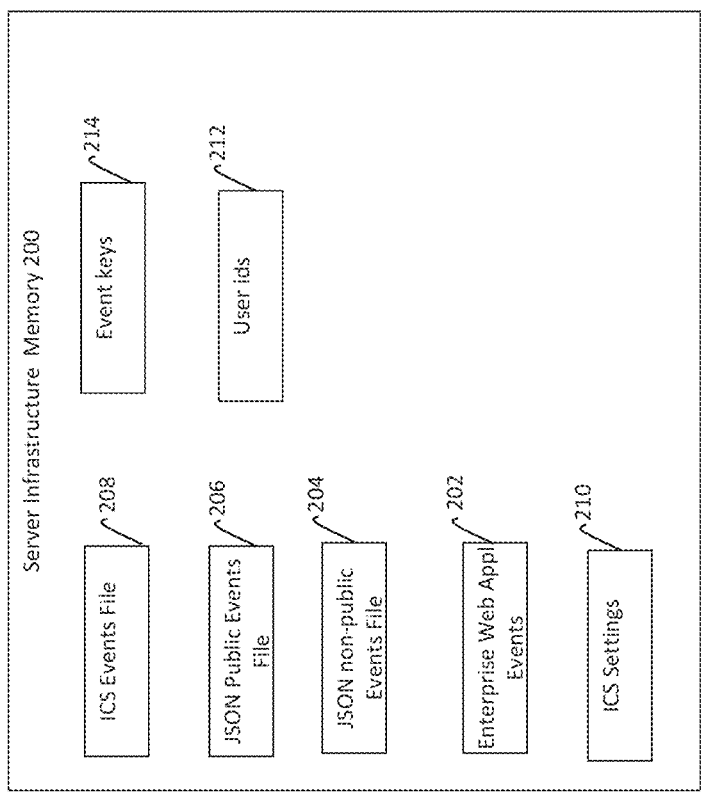
FIG. 2 illustrates example data elements stored in memory associated with the server devices, according to some example embodiments.
Figure 3:
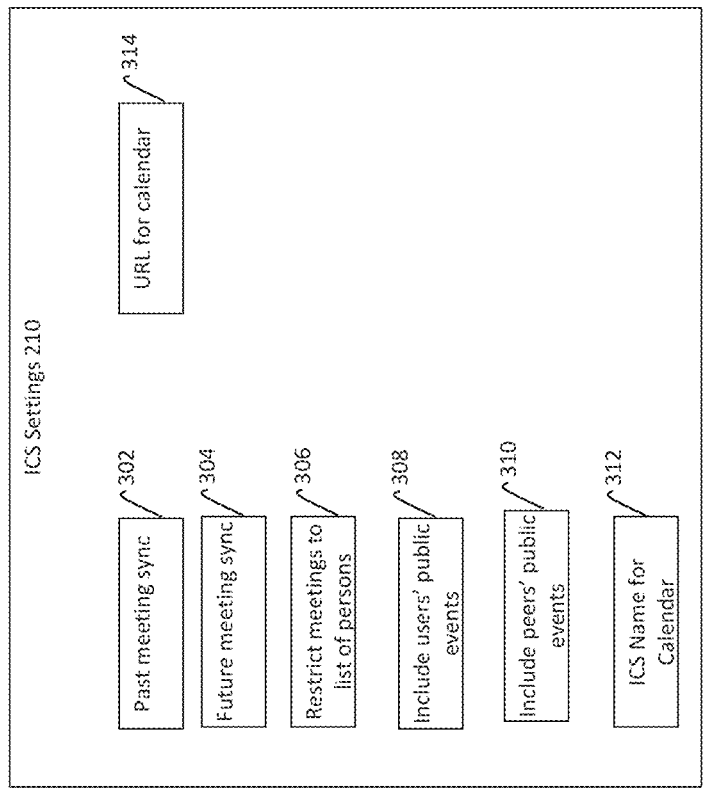
FIG. 3 illustrates some of the configuration settings for event sharing, according to some example embodiments.
Figure 4:
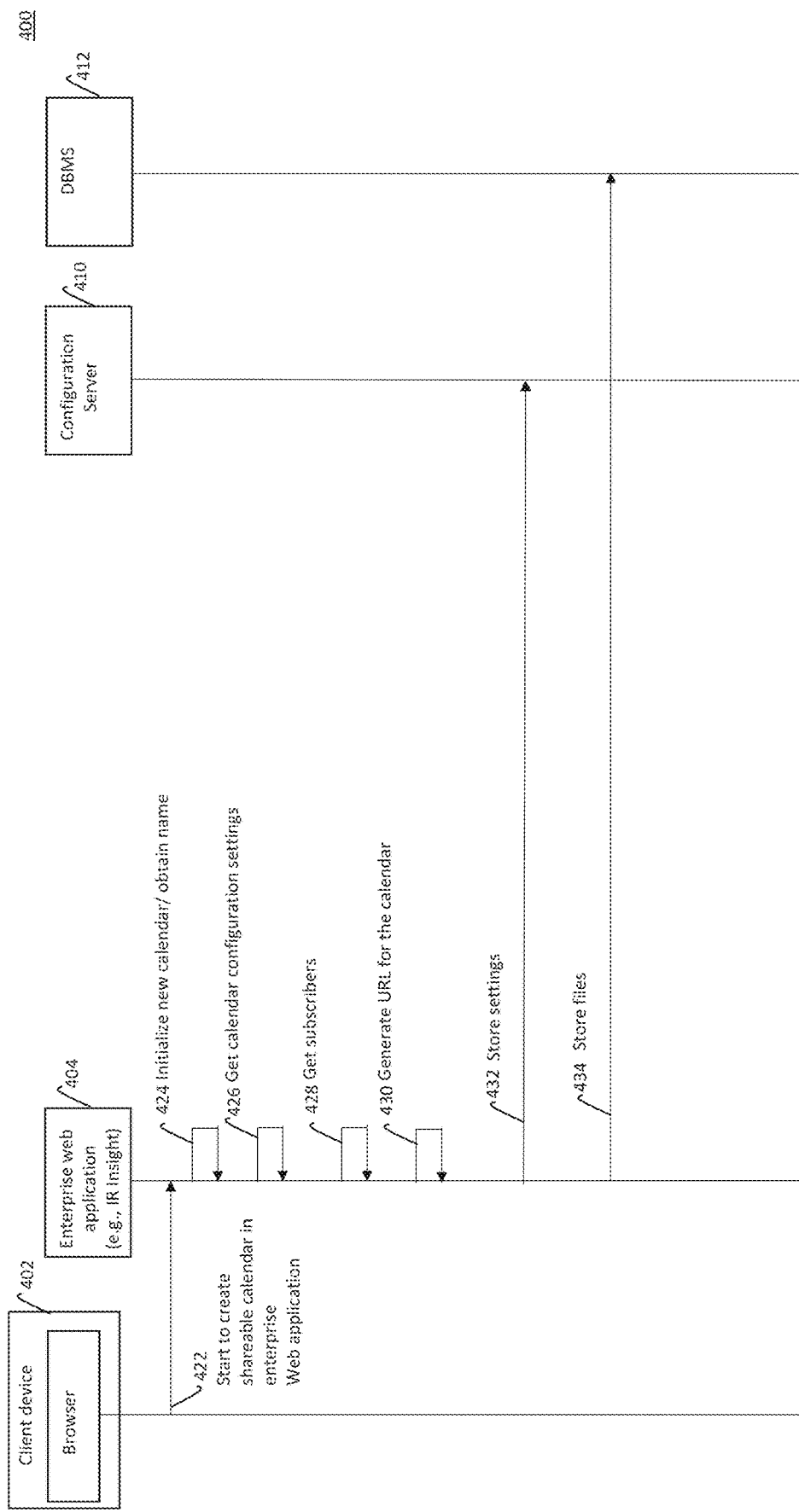
FIG. 4 is a flowchart illustrating the creation of a shareable calendar, according to some example embodiments.
Figure 7:
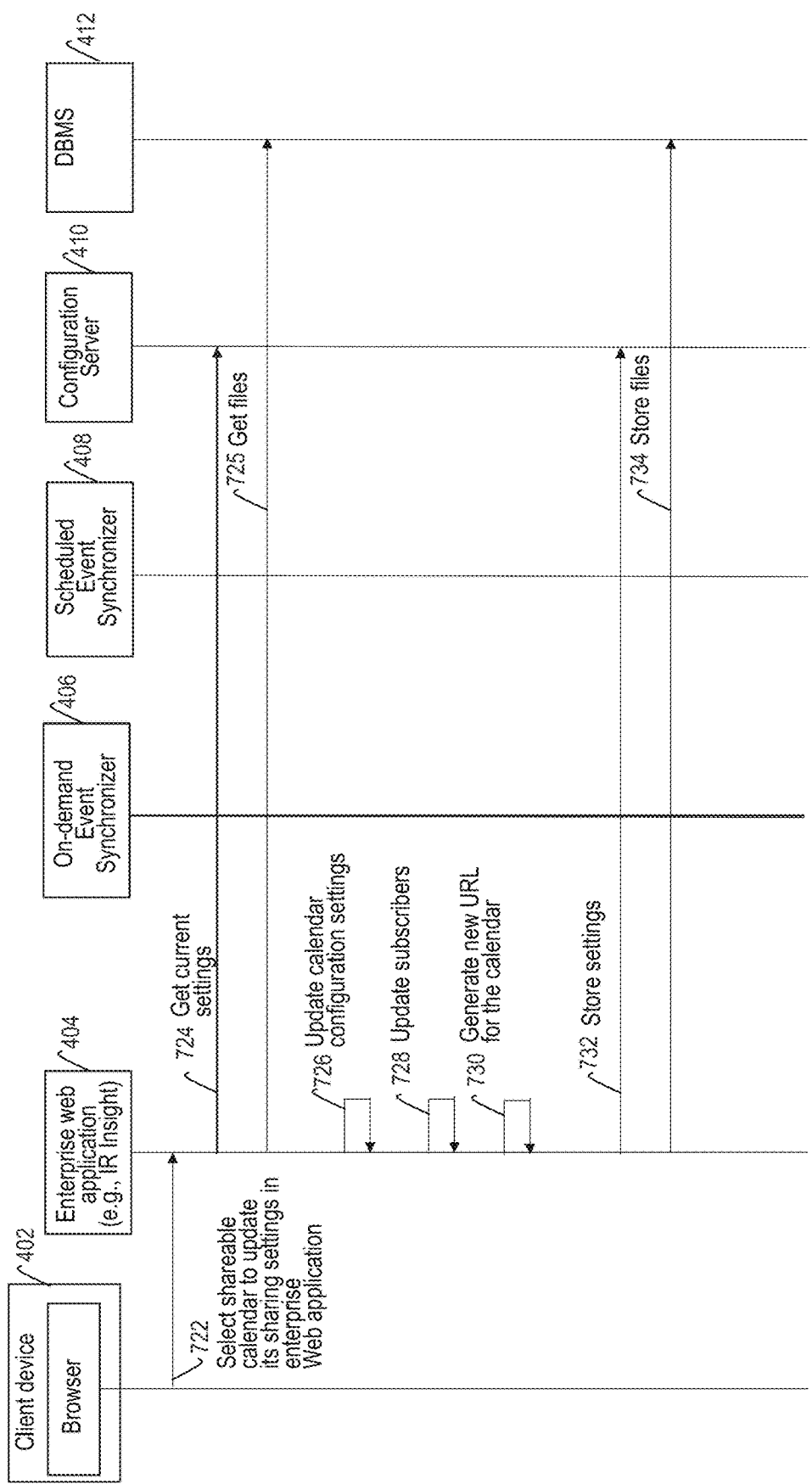
FIG. 7 is a flowchart illustrating the effecting a change to configuration settings for a shareable calendar, according to some example embodiments.
Figure 8:
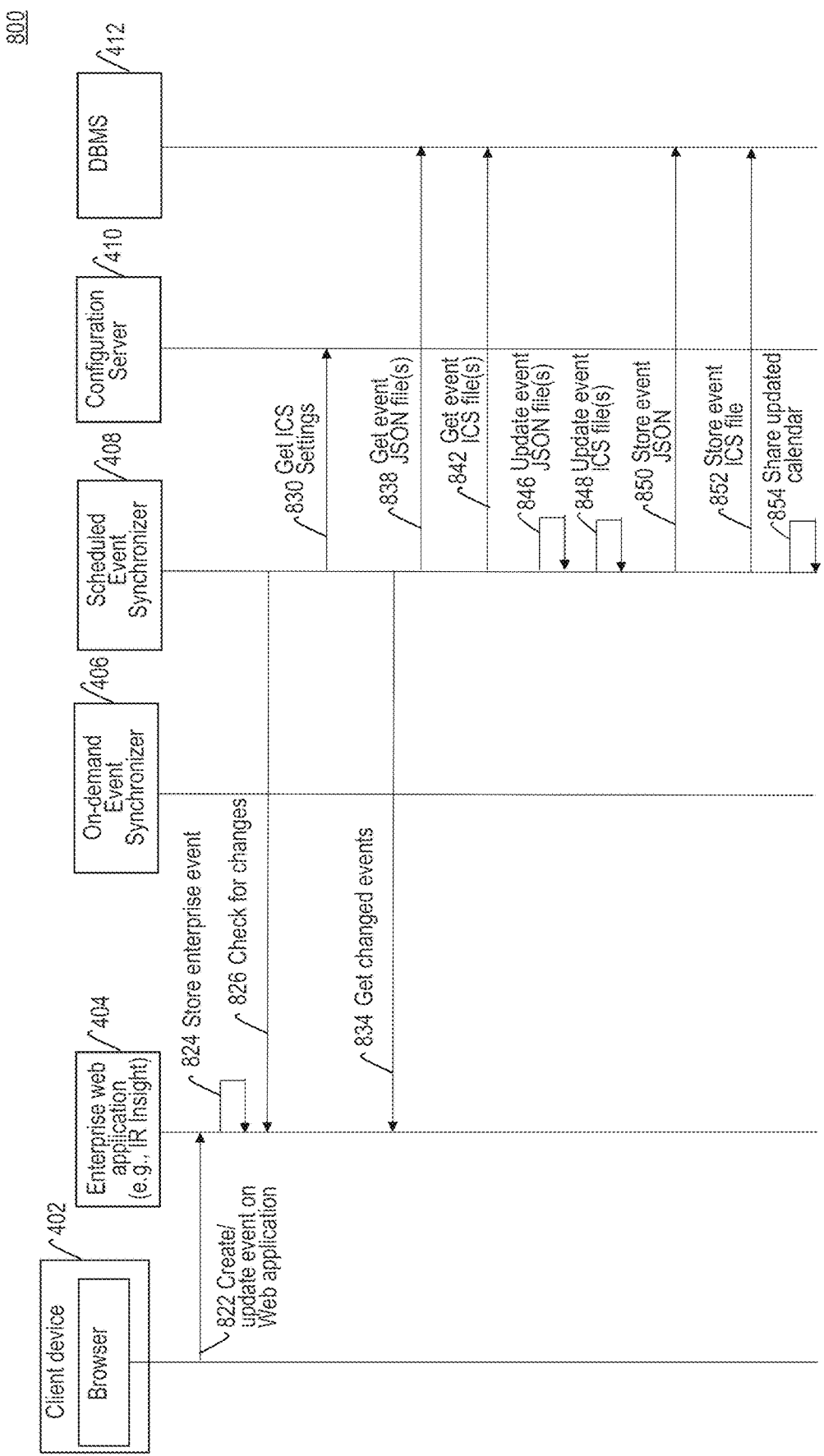
FIG. 8 is a flowchart illustrating the processing upon creating or updating event information in an enterprise web application, according to some example embodiments.
Figure 9:
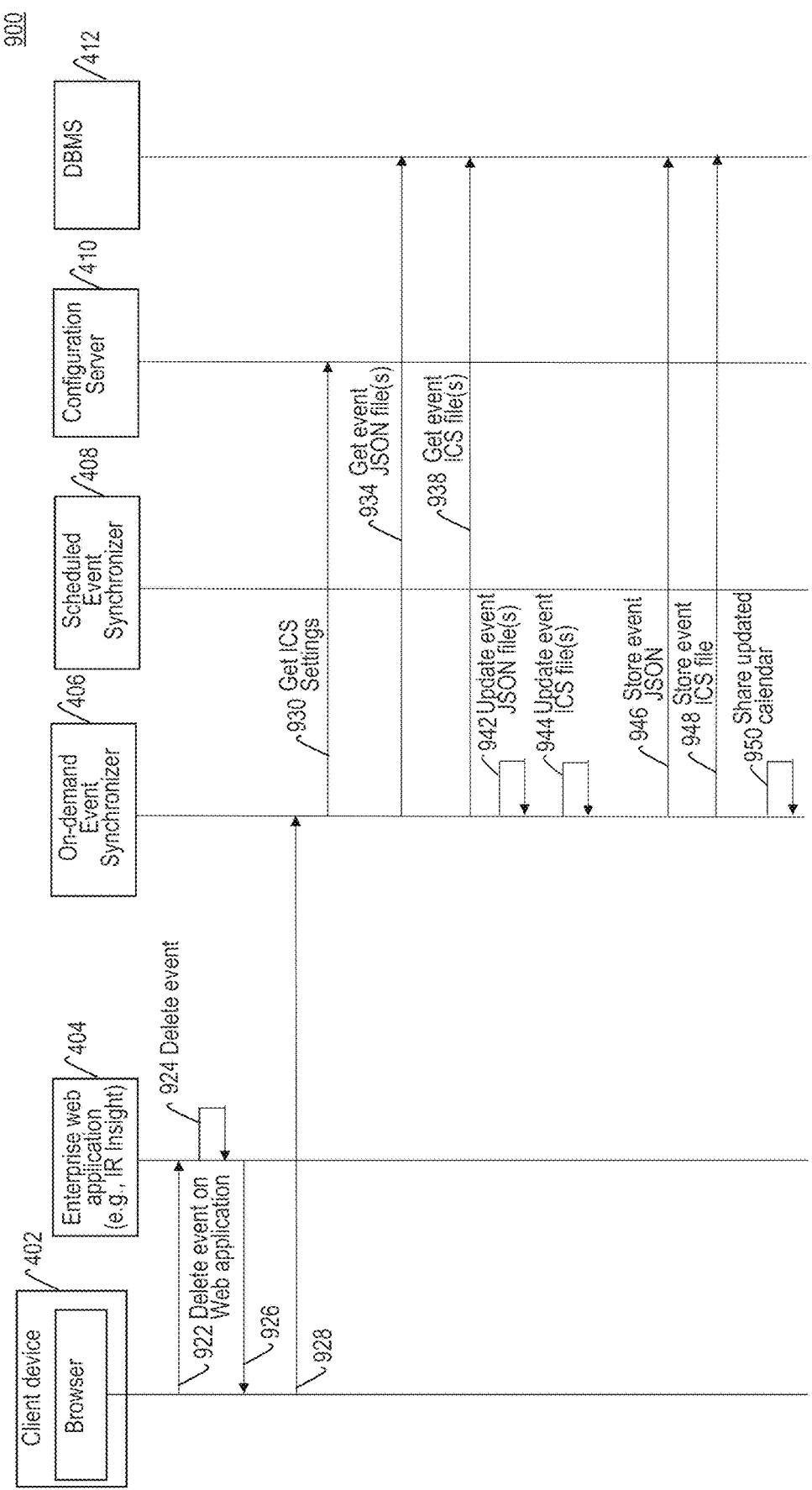
FIG. 9 is a flowchart illustrating the processing upon deleting event information in an enterprise web application, according to some example embodiments.
Figure 10:
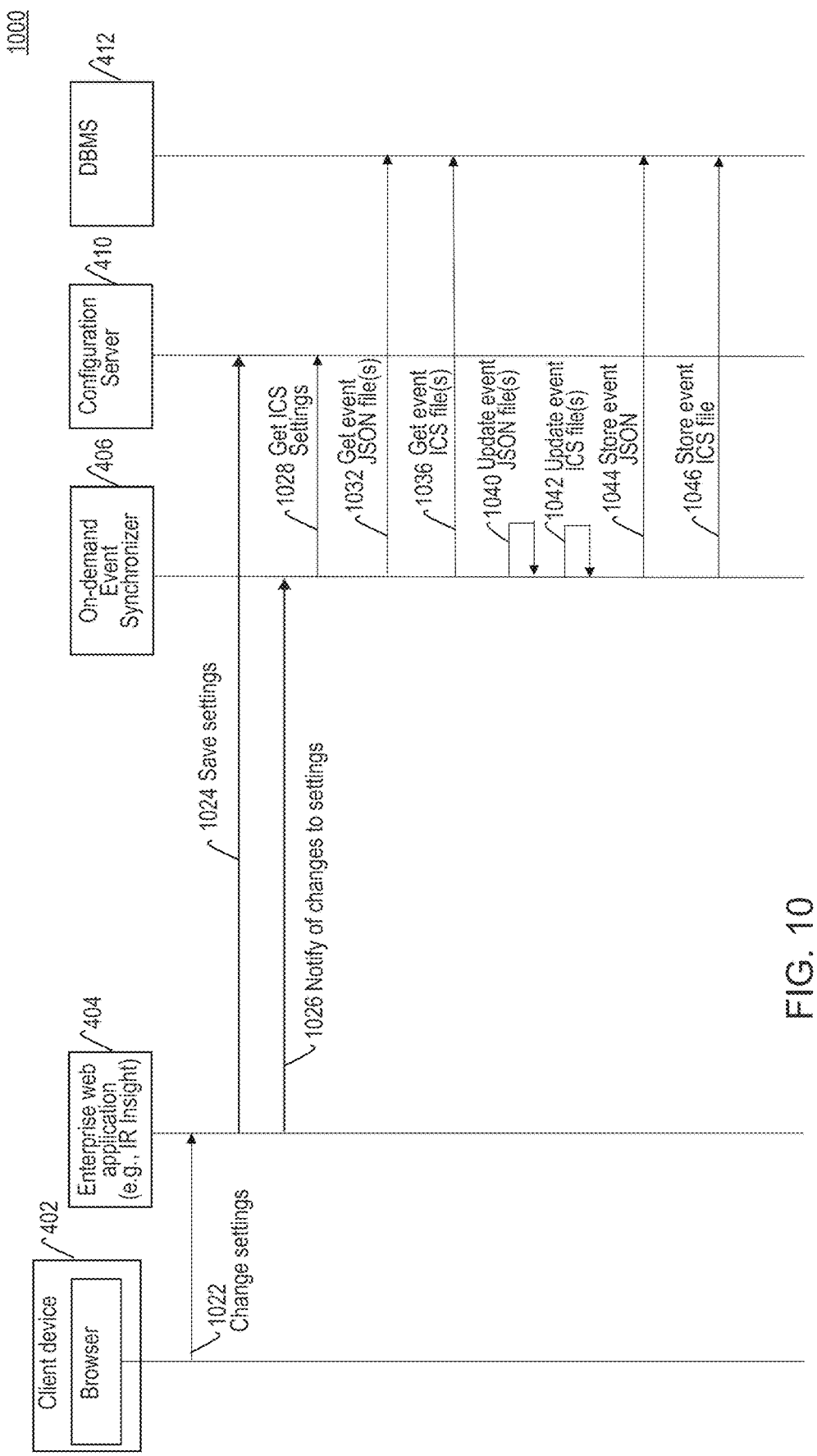
FIG. 10 is a flowchart illustrating the processing upon completing a change in configuration settings that control event sharing, according to some example embodiments.
Figure 11:
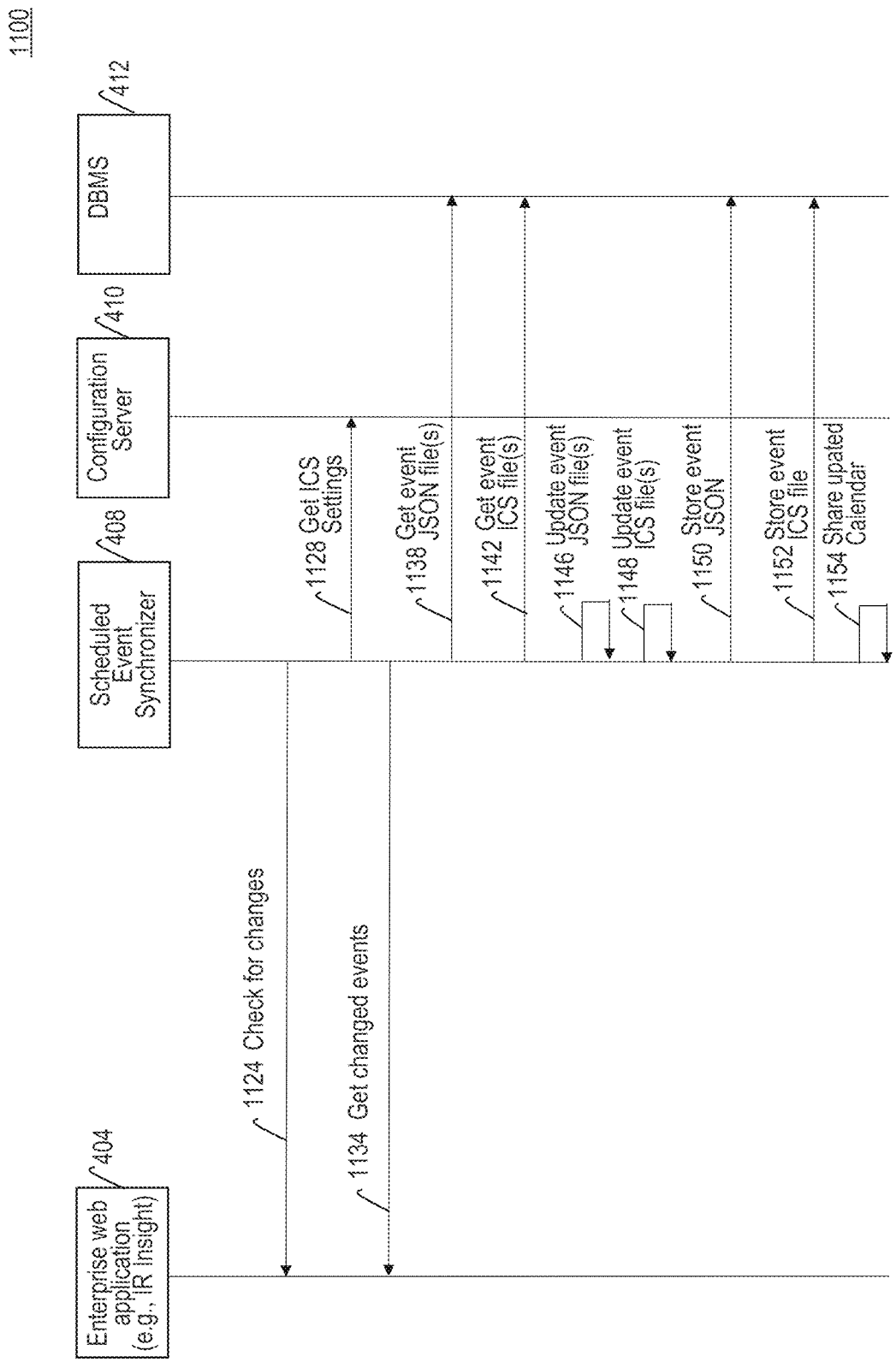
FIG. 11 is a flowchart illustrating the processing for scheduled updating of shareable event information in an enterprise web application, according to some example embodiments.
Figure 12:
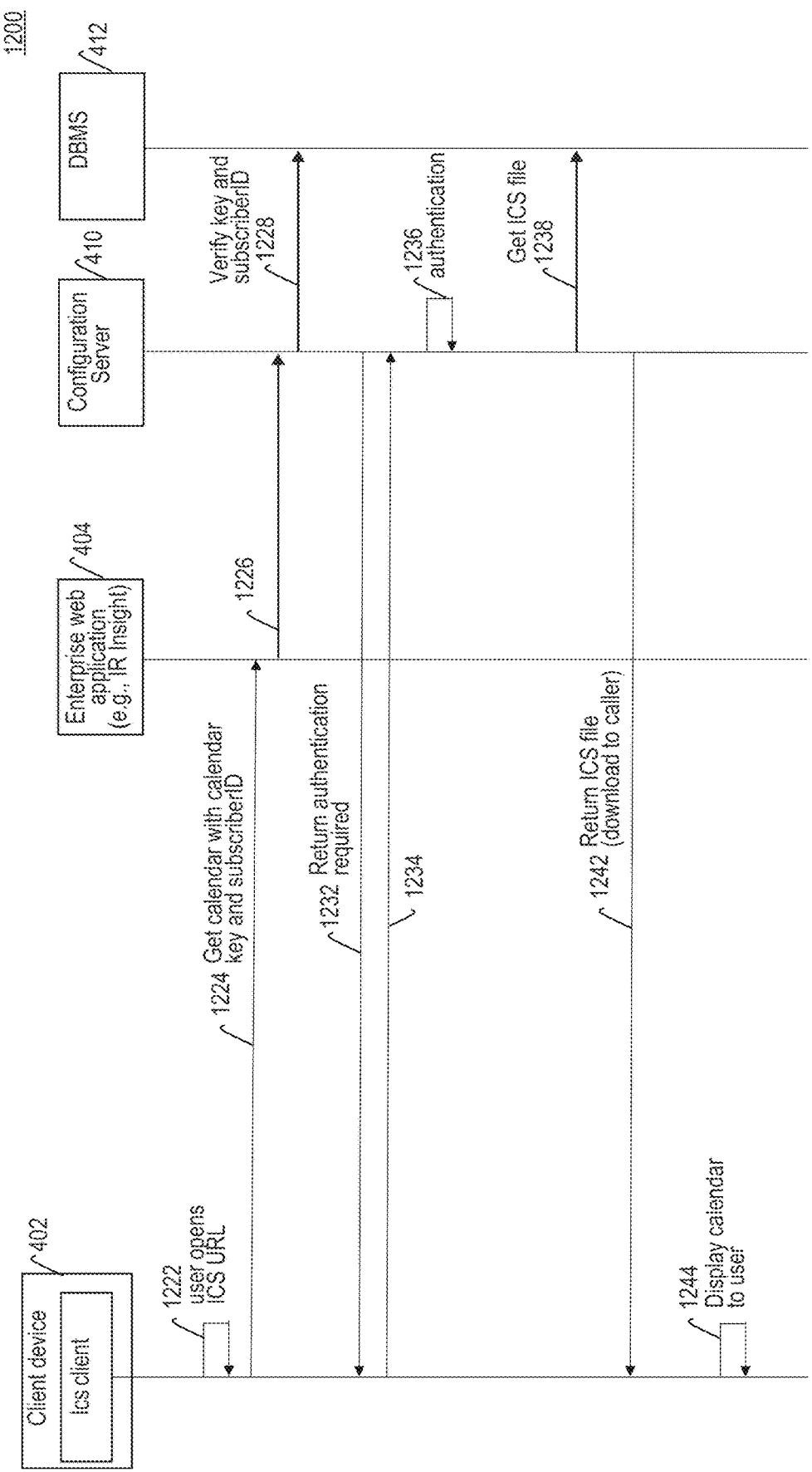
FIG. 12 is a flowchart illustrating the processing upon an ICS client accessing a shared calendar provided by an enterprise web application, according to some example embodiments.
Figure 13:
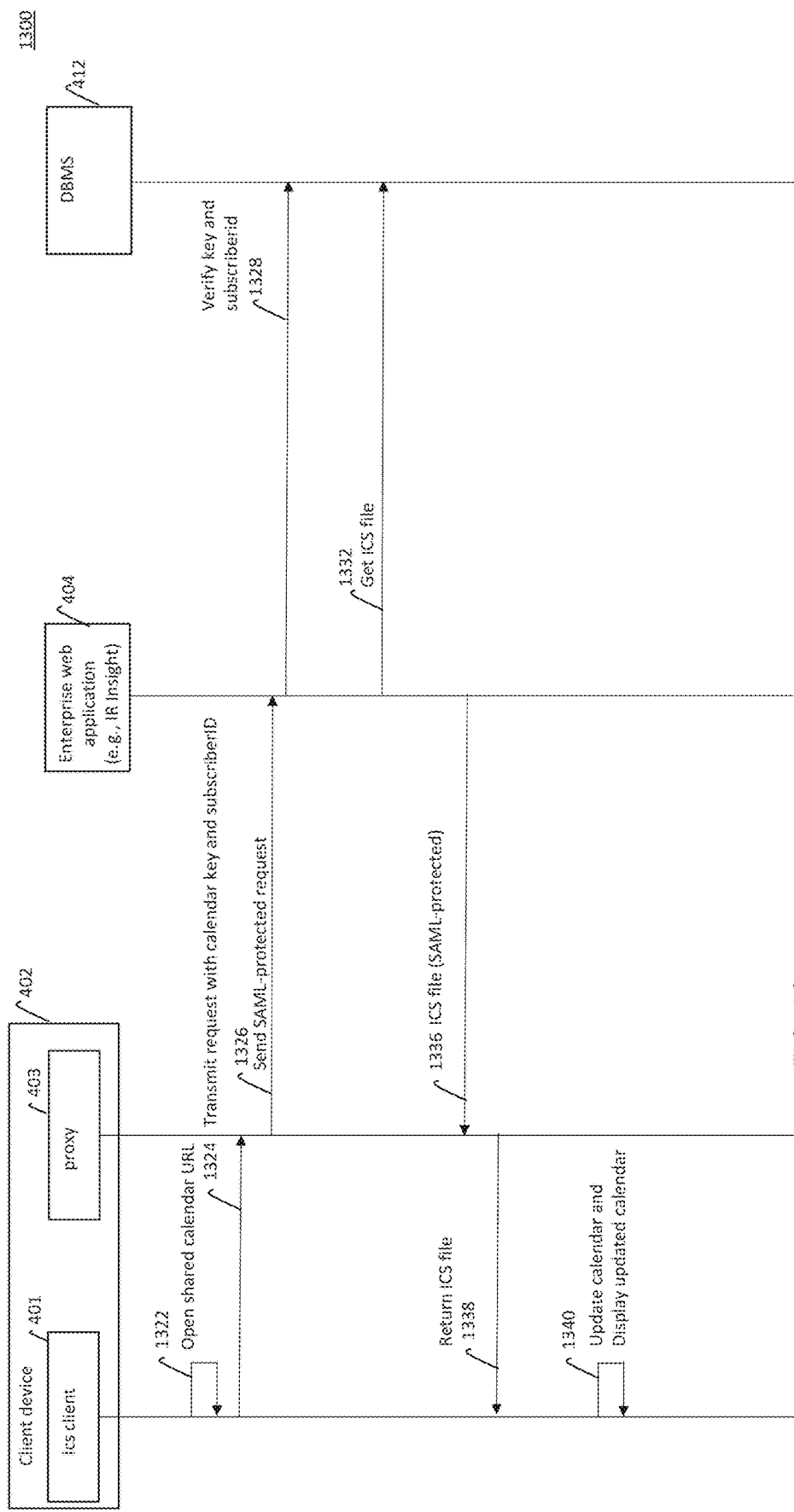
FIG. 13 is a flowchart illustrating the processing upon an ICS client accessing a shared calendar provided by an enterprise web application with the use of a proxy agent on the client, according to some example embodiments.
Figure 14:
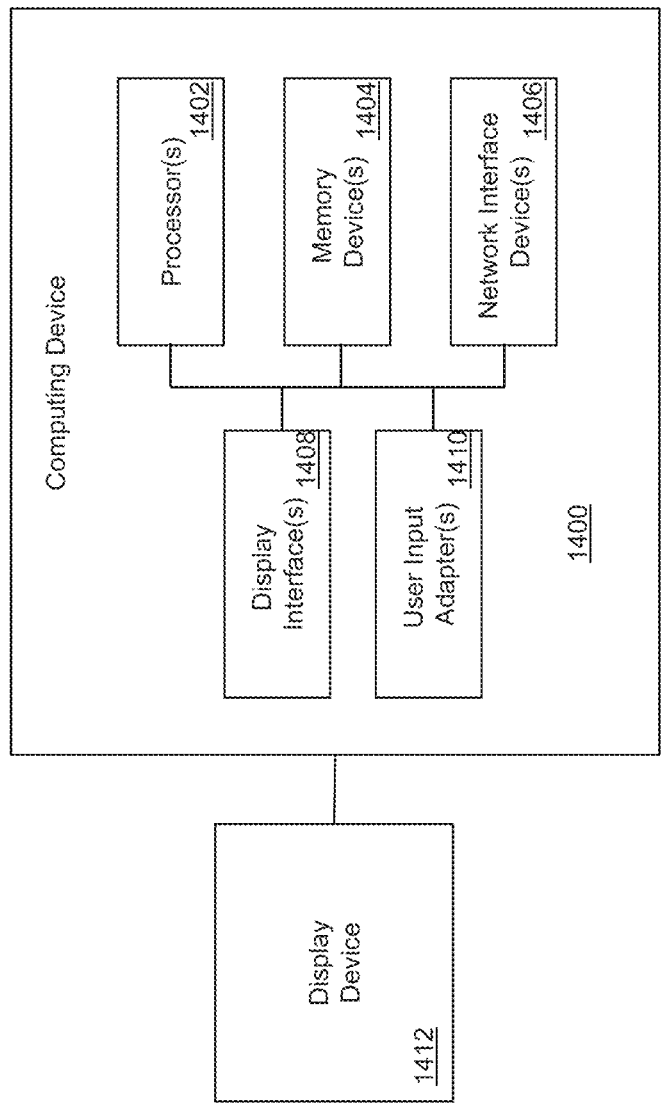
FIG. 14 schematically illustrates a computing environment in which the client devices and/or servers can be implemented, in accordance with some example embodiments.

FIG. 1 shows an example computing environment in which claimed systems and methods synchronize electronic calendars between an enterprise web application and one or more other event services. FIG. 2 illustrates example event information and other data that may be maintained in a server of the system shown in FIG. 1. FIG. 3 illustrates example settings that can be made with regard to calendar synchronization. FIG. 4 shows an example process for the creation of a shared calendar for public events and for non-public events. The calendar may be displayable as a consolidated calendar in the enterprise web application, and may be shareable with other event clients. FIGS. 5 and 6 illustrate example user interfaces for adjusting settings for event sharing and for modifying calendar subscriber information, respectively. FIG. 7 illustrates a process for the updating of sharing settings of a shared calendar such as that created by the process shown in FIG. 4. FIG. 8 illustrates a flowchart of processing actions during the creating or updating of a calendar event. FIGS. 9 and 10 illustrate show example processes for deleting a calendar event and for changing calendar settings, respectively. A calendar synchronizer process that may be used in FIG. 1 is illustrated in FIG. 11. FIG. 12 illustrates an example process by which a client accesses a shared internet calendar. The client may initiate the process upon receiving a calendar sharing message, such as, for example, a message including a Uniform Resource Locator (URL) to an internet calendar. FIG. 13 is a flowchart illustrating an example process in which the interaction between the client and the server is protected using SAML. FIG. 14 illustrates an example computer which may be used in the system shown in FIG. 1.

Description of FIG. 1

FIG. 1 illustrates a non-limiting computing environment 100 including one or more servers 102 (also referred to herein as "server infrastructure") and one or more clients 104 and 106, according to some embodiments. The one or more servers 102 communicate with clients 104, 106 and one or more external servers, so that users on client devices 104 and 106 can access web applications 112 (also referred to as "enterprise web applications") executed on the one or more servers 102. Servers 102 may also communicate with one or more internally used systems such as, for example, a document management system 118. The communication between the servers 102, clients 104, 106, and document management system 118 may be over the internet or any other communication network. For example, the communication connections 120 and 122 between the one or more clients 104, 106 and server infrastructure 102 may be over the internet or other network.

Servers 102 may be implemented on one or more physical server computers that are communicatively connected to each other over a network. The one or more physical server computers may be geographically co-located or distributed. Servers 102 may include a database management system 110 and one or more server-side web applications 112 (e.g., 112*a* and 112*b*) and a core services application 114.

Each web application 112 may be designed and operated according to a three-tier model of a web server, application server and database. As in conventional systems, the web server of each web application 112 includes the capability to communicate with external entities via HTTP and other protocols such as JSON, HTML, XML, JavaScript, Cascading Style Sheets (CSS), etc. The application server of each web application 112 provides the processing logic for the application, and the database of each web application 112 provides for storing and reading data.

Web applications 112 may interact with the core services application 114 for managing user authentication, with clients 104 and 106 for receiving input from and for transmitting out to, and the database management system 110 for obtaining information to be provided to the requesting client applications running on clients 104 and 106. In some embodiments, some or all of the information provided to requesting clients may be generated by the web application itself and/or other web application executing locally on the same one or more servers 102.

Core services application 114, which may also be designed and operated according to the three-tier model described above, may provide one or more services that are commonly used by the web applications 112. Example services that may be provided by core services application 114 include authentication of users, management of sessions, etc.

Web applications 112 operate to receive requests from clients 104 and 106, perform processing and/or obtain information from the database 110 and/or external servers (not shown), and respond to clients 104 and 106 with a result from the processing and/or obtained data. Web applications 112 may utilize core services 114 for administering users, user sessions and/or external server sessions. In some embodiments, web applications 112 may, in response to requests from a web application client on a client devices 104-106, may interact with event service 116 to provide information regarding one or more scheduled events and/or scheduled event participants.

A web application may comprise one or more client-side components and one or more server-side components. Client-side components of a web application may operate to provide for handling the user interface by performing presenting (e.g., displaying) of information on a user interface device; receiving user input; etc. Server-side components may provide for authentication, service metering, generating or obtaining information to be presented to the user in accordance with received user inputs.

Embodiments are not limited to particular types of web applications. Web applications that may be used in embodiments include those designed according to the single page application (SPA) model, any non-SPA model, or a combination of both.

SPAs are web applications that operate within a single web page. In an SPA, the content for a single web page is sent by the web server to the web browser, and that page is loaded/rendered, as described above with the traditional web application. Subsequently, when the user wants to view different content within the application, the user will click a hyperlink or input on the page. But instead of navigating to a different page as in non-SPA web applications, the same page will remain loaded, and its content will be dynamically updated. This dynamic updating may be accomplished in a number of different ways; it may involve, for example, the web browser performing background HTTP fetches for new content, updating the Document Object Model (DOM) of the page (via JavaScript code), and/or other techniques.

AngularJS® is a web application framework that is used to create SPAs. At the web browser, AngularJS JavaScript libraries are loaded and interpret HTML templates which are embedded with AngularJS scripts and other AngularJS coding constructs, such that the resulting pages behave as defined in the templates. Other frameworks (e.g., Backbone.js, Ember.js, and React) may also be used for SPA applications.

In some non-SPA web application models, a web application includes a number of different web pages. To render a particular web page within the application, the following set of interactions is performed: a web browser at a client device requests (using an Hypertext Transfer Protocol (HTTP) message) a particular web page from a web server; in response, the web server transmits (using HTTP) the code for the page back to the web browser, the code including, e.g., HTML, JavaScript®, and Cascading Style Sheets (CSS) code; the web browser then loads the code and renders the page, thereby enabling a user to view and interact with the page. When the user subsequently wants to view different content within the application, the user will click a hyperlink or input on the page that points to a different page within the application, and then the above-mentioned request/response/load/render procedure is performed for the different page.

The database management system 110 (sometimes also referred to herein simply as the database), may be a commercially available DBMS, or other data record management system. Although shown as a single DBMS, DBMS 110 may include one or more separate databases. Embodiments are not limited to any type of database management system.

Clients 104 and 106 can be configured to execute the same or different client applications. In the illustrated example embodiment in FIG. 1, client 104 includes a web browser 126. Client 104 may also have stored on it a client-side app 128 which may be a native app for email/event management. An example email/event management application (also referred to as "event application") is Microsoft's Outlook™, but the use of other email/event management application clients (e.g., Google Mail™ and Google Calendar™ from Google™, Yahoo Mail™ and Yahoo Calendar™ from Yahoo™, etc.) is contemplated as embodiments of the invention. When browser 126 is used to access a web application 112, client-side code 128 for a web application 112 executed within browser 126. The client-side code 128 may perform client-side processing for a corresponding web application on server 102.

As illustrated in FIG. 1, when a web application client 126 communicates with an enterprise web application 112, the web application 112 may obtain any information requested by the client from one or more external servers (not shown) and/or database 110 and provide to the client application. In some embodiments, some or all of the information provided to the requesting clients 104 may be generated locally by servers 102.

Clients 104 may include personal computers, mobile computers, tablets, smartphones, and other electronic devices. In some example embodiments, any electronic computing device including at least a display, an input device for user input, and a communication interface for communicating with the server device may operate as a client device. Client 106 may be of similar configuration as client 104, and may include a web browser 130 within which an application client-side code 132 executes for accessing the enterprise web applications 112.

One or more other client devices 108 may also be connected via any type of network connection 124 to server infrastructure 102. Client device 108 may be used by a user, who may or may not have access to the web application 112, in order to obtain information regarding various events that are shared with the web application. Client device 108 may include an event client 134, which may be, for example, any type of event management application client. In some example embodiments, the event client 134 may be an internet calendar sharing client (ICS client) that is capable of using calendar or event information received in a form such as iCalendar format for sharing calendar information.

It should be understood that the software modules shown in FIG. 1 are stored in and executed by hardware components (such as processors and memories), and it should be further understood that, whenever it is described in this document that a software module performs any action, that is done solely for ease of description, and the action is in actuality performed by the underlying hardware according to the instructions and data that comprise the software module. Further details regarding example hardware components that may be used to implement the features described herein are provided below with reference to FIG. 14, as well as in other places in this document.

In an example implementation, the computing environment 100 may be associated with an enterprise, such as, for example, Nasdaq Corporation. Example web applications 112 may include real-time market analysis applications (e.g. IR Insight™) and a client account status application. Users of web applications 112 may include financial analysts and/or other employees of the enterprise. Core services application 114 may provide common services such as administration (e.g., creating user accounts, administering entitlements, etc.) authentication (e.g., create/manage sessions for users to access certain services, etc.) and authorization (e.g., check whether user is entitled to access certain services or features, etc.) for users. Core services application 114 may, among one or more other processes, include an interface for interacting with one or more event management servers, such as event service 116. Web applications 112 may interact with email server 114 either directly or indirectly via core services 106.

Servers 102 may represent one or more servers and the associated infrastructure used by the enterprise for running web applications 112, core services application 114 and associated software, and event server 116. The document management system 118 may include a customer relationship management application that communicates with the web applications and/or core services application for delivering services to the enterprise's users.

When a user (e.g., an analyst of the enterprise) using client 104 accesses the real-time market analysis application on servers 102, an SPA may be displayed on the client device, and various real-time or value-added information from the vendors (e.g., such as those operating external servers) and/or the corporation's internal analysts etc., can be displayed in the one or more portions of the displayed SPA. The SPA may have, as one component displayed, event information regarding a calendar and/or one or more upcoming scheduled events involving the user. For example, the displayed event information in the SPA for a particular enterprise user may be a consolidated calendar integrating enterprise-only events scheduled in the enterprise web application and other events received from external event sources 136 over a network connection 138. The external event source 136 may be an event streaming service, a public calendar, or the like. Example types of events received from an external source may include, without limitation, events such as earnings announcements by corporations, information sessions, etc. Some of the events in the consolidated calendar of a particular user (e.g., such as a user of client device 104) may also be from other users (e.g., users of client devices 106 and 108).

Description of FIG. 2

FIG. 2 illustrates example data components stored in memory associated with the servers 102, according to some example embodiments. The memory 200 in which the data components are stored may be in one or more servers and/or in DBMS 110, and may be volatile, non-volatile memory or a combination thereof.

Enterprise web application events 202 stores event information created in and displayed in enterprise web application 112. This file may be in a file format specific to (and/or proprietary to) the enterprise web application 202. Each event may be represented by a data structure which includes an event identifier, date and time of event, event description, event publisher, event subscribers, event type information etc. Each enterprise user (e.g., users registered and/or authorized for accessing the enterprise web application) may be associated in the file with none, one or more event list data structures (sometimes also referred to as "calendar data structures" or simply "calendars"), where each event list includes one or more event data structures. In some embodiments, the event list data structure of a particular user may include pointers to each event in the event schedule of that particular user. In some embodiments, this file may also include event information received from an external source. According to some embodiments, the enterprise web application events 202 can be arranged and stored as a plurality of separate calendar files. In some embodiments, each calendar may be identified by a unique calendar identifier, and each event within a calendar by a unique event identifier.

Non-public events file 204 and public events file 206 are generated based, at least partly, from the enterprise web application event file 202, events scheduled in the enterprise web application, event information received from external event sources and/or event information shared by other users. Each event file 204 and 206 may include one or more listing of events (e.g., calendars) for each user. The information for each event in a listing of events for a particular user may include the necessary information for event scheduling and/or may include a pointer to a separate area in the same file or to another file for the details of each event. Event specifying information such as an event identifier, date and time of event, event description, event publisher, event subscribers, event type information etc., may be specified for each event in the schedule. In certain example embodiments, the files 204 and 206 are in JSON format which is capable of use across event applications. Other file formats that are capable of being used across multiple different types of event clients are also contemplated in embodiments.

ICS events file 208 (also referred to as "ICS file" or "internet calendar file") is generated based at least based on the public events file 206. In certain example embodiments, ICS events file 208 may also be based upon the private events file 204. The ICS file format which allows Internet users to send meeting requests and/or calendars to other Internet users by sharing or sending files in this format through various methods. The files usually have an extension of ".ics", indicating that they are iCalendar files. With supporting software, such as an email reader or calendar application, recipients of an iCalendar data file can respond to the sender easily or counter-propose another meeting date/time. The file format is specified in a proposed internet standard (RFC 5545) for calendar data exchange. In certain example embodiments, the file extension may be different, for example, ical, ifb, iCalendar, etc. Each ICS event may be identified using information such as type of event, time of event, date of event, publisher of event, subscribers, and location.

The ICS settings file 210 is a collection of configuration settings for controlling the generation of ICS events files. Some or all of the settings configurations may be stored separately for each enterprise user, and some settings, including default settings, may be stored for all enterprise users. The contents of the settings are discussed below in relation to FIG. 3.

User file 212 includes user identification information, user capabilities, and authentication information. For example, user file 212 may be a master file of users with whom calendars can be shared (e.g., a master list of users who are potential subscribers), and each user may have an associated email address, types of events interested in, affiliation (e.g., organization associated with), whether or not authentication is necessary, and the like.

Event keys 214 stores keys associated with some or all event calendars. The keys may be generated using any type of key generation software. In some embodiments, a key may be an obfuscated value of a representative string (e.g., an obfuscated character string of the actual file name). Some of the keys may represent calendar keys, where each calendar in enterprise web application events file 202 is assigned a respective calendar key. Some others of the keys may represent subscriber keys. Each calendar in enterprise web application events file 202 may also be assigned, in addition to the calendar key, a subscriber key representing the owner or publisher of the calendar. In some embodiments, some calendars may, instead of the subscriber key representing the owner or publisher, have a subscriber key that uniquely identifies that subscriber to the system.

In some embodiments, the event keys file 214 may associate the calendar keys, or calendar key and subscriber key pairs, with an event identifier in the enterprise web application events file 202. The association may extend to corresponding calendars in one or more of non-public events file 204, public events file 206 and ICS events file 208. As discussed below in further detail in relation to some of the flowcharts, the keys file 214 may provide an index by which the various separate calendar files affected by an action can be identified.

Description of FIG. 3

FIG. 3 illustrates some of the configuration settings for event sharing, according to some example embodiments. The configuration settings may be stored, for example, in the ICS settings file 210. These settings may be used in the generation of the ICS file 208 that is transmitted to other clients running ICS client applications.

The settings parameters may include a duration for synchronizing past events 302 (e.g., a number of days, weeks, or months), a duration for synchronizing future events 304 (e.g., a number of days, weeks or months), listing of persons who receive event notifications 306, whether or not to include user's public events 308, whether or not to include public events shared by peers 310, ICS name 312 and URL for event 314.

The settings, or some subgroup of the individual setting parameters, can be specified per user, per group of users or for all users. For example, by default for all users a certain number of weeks (e.g., 2 weeks) may be set for synchronizing future events and for synchronizing past events. The synchronization duration can be important in the usability of the system. For example, when the synchronization duration is longer (for past or future events), a larger number of events are synchronized to the client devices of users, thus increasing the overhead on client devices. Client devices that are frequently in environments may prefer to reduce the volume of events synchronized in exchange for less accurate listing of events that are distant from the current time. Therefore, individual users may choose to custom configure the synchronization durations (future and/or past events) of their calendars with due consideration to the mobility of users with whom the calendar is shared and the need for keeping the shared list of events current with respect to events distant from the current time.

The restricting to listing of persons setting 306 allows the publisher to configure whether the calendar is to be shared with all other users associated with the system (e.g., all users listed in the master list of users 212) or some subset of users. If the setting 306 specifies that the calendar is shared with a restricted list of persons, the publisher may then identify the subscribers with whom sharing is allowed either by user identifiers, or by corporate or other affiliation.

The user public event setting 308 controls whether the calendar shares public events received from public event streams subscribed by the publisher of the calendar. The peer public event setting 310 controls whether the calendar shared public events that are shared by other users and received by the publisher. For example, this setting 310 allows the publisher to control the sharing of events that are not from sources that the publisher subscribes to. For example, although publisher does not subscribe the company X's event calendar and thus does not receive event announcements from company X, another user may subscribe to X's events and may share them with the publisher, who then needs to decide or control whether such events are distributed with its shareable calendar.

The name of the calendar 312 may be automatically generated. In some embodiments, the name may be configured by the publisher. A URL 314 for the calendar is also either generated and/or manually configured. An example format of the URL 314 is described in relation to FIG. 4 below.

The above settings are examples, and persons skilled in the art will understand that other settings with respect to configuring the ICS file are possible and may or may not be included in the settings file.

Description of FIG. 4

FIG. 4 is a flowchart illustrating a process 400 for the creation of a shared calendar, according to some example embodiments. The flowchart illustrates, for example, the creation of a calendar of public events and of non-public events created in an enterprise web application. The calendar is displayable as a consolidated calendar in the enterprise web application, and is shareable with other event clients. Example message interactions between client device 402, enterprise web application 404, configuration server 410 and DBMS 412 are shown. The client device 402 may, in some example embodiments, correspond to client device 104 or 106 shown in FIG. 1. The event-related functionality of the enterprise web application 404 and configuration server 410 may be provided, according to some embodiments, by the enterprise web application 112, core services 114, and event server 116 shown in FIG. 1. The DBMS 412 may represent DBMS 110 shown in FIG. 1 and other storage memory in server 102.

At operation 422, upon input from a user, the client device 402 initiates creation of a shareable event calendar in the enterprise web application. The calendar creation may be initiated by selecting a button or menu option etc. from an interface displayed on a browser on the client device. Prior to the initiation, the user may have been properly authenticated and logged in to the enterprise web application. For example, in some embodiments, in the example system shown in FIG. 1, the user on client device 104 may be authenticated by the core services 114 for accessing applications hosted by server 102 including enterprise web application 112.

The calendar created by process 400 is a shareable calendar that can be shared, in whole or in part, with other enterprise users and/or non-enterprise users. The calendar may subsequently be populated to include public events that are published by an external event source and non-public events, or events access-limited to registered users of the application. The public events and the non-public events may be displayed together in a consolidated calendar for the user in the enterprise web application. The non-public events from the enterprise web application and the public events from an external event service are sometimes referred to as first events (of a first event type) and second events (of a second event type), respectively.

At operation 424, in response to the user input, the enterprise web application begins the process of creating a new calendar for the user. The subsequent processing operations 426-434 are, or are the result of, interactions between client 104 and enterprise web application 112. Although only a single interaction is explicitly shown between the client and the enterprise web application, a person of skill in the art will understand that one or more other interactions, for example, between the client and the enterprise web application and/or the enterprise web application and the servers, may occur before operation 432.

Initializing a new calendar at operation 424 may include the creating and populating of calendar data structures in the memory of the enterprise web application, and the creation of files on the DBMS or other location. During operation 424 a name for the calendar may be obtained from the user, or may be automatically generated (e.g., based upon the user's userID). Each user may have any number of shareable calendars.

At operation 426, calendar settings are obtained from the user. An interactive interface may be used for obtaining the user's input with respect to desired settings. FIG. 5 shows a part of an example interface that can be used for obtaining user input regarding settings. The setting may include, for example, and without limitation, calendar name, duration for which past events are to be synchronized, duration for which future events are to be synchronized, whether to share public events subscribed to by the user, and whether to share public events notified by other users.

At operation 428 subscribers with whom the calendar is to be shared are determined. The user may be presented with an interface using which he may select or specify one or more subscribers for the calendar. FIG. 6 shows a part of an interface that may be displayed on the client for obtaining subscriber information. The subscribers may be identified by a userID and/or an email address. The interface may also provide the user with the capability to configure passwords (if any) for individual subscribers, and custom URLs (if any) for individual subscribers to access the calendar. In some embodiments, if the user provides no subscribers, the system may have a default group of subscribers that may be determined differently for each calendar owner (e.g., all subscribers in the master subscriber list 212 who have a same affiliation as the calendar owner, etc.).

At operation 430, a unique URL is generated for the user's calendar. The URL may be of a form such as webcals://<server>/calendar?key=icskey&skey=wewrwrwrr" according to the Webcal scheme for sharing iCalendar files. The "key" in the URL uniquely identifies the calendar, and "skey" may map to the owner of the calendar or to a particular subscriber. The URL generated in this operation may be used as the default URL to be used for accessing the calendar. However, automatically or by user configuration, individual subscribers may be assigned custom URLs for accessing the calendar. Custom URLs enable individual authentication of subscribers who attempt to access the calendar, and also provides the capability for the calendar owner, or a system administrator to, disable any particular URL in order to deny a particular subscriber access to the calendar.

At operation 432 and 434, the setting for the calendar are saved, for example, by storing the settings in a configuration server and/or DBMS, and optionally the files can be saved in the DBMS. The saved calendar information may include settings and at least one calendar file accessible by the enterprise web application. Optionally at these operations, separate files for maintaining public calendar events and for non-public calendar events may be maintained. A first file may store selected information regarding public events and a second file may store selected information regarding non-public events. The separate files for public and non-public events may improve performance of calendar synchronization. For example, because the public events may be larger in volume and/or lower in general time criticality, the public events may not be synchronized at the same rate or interval as the non-public events. Moreover, still optionally at this operations, an ICS file may be created for the calendar. The ICS calendar file may be stored so that it is accessible using the associated icskey (referred to also as the calendar key) in the corresponding URL. As noted earlier, several skeys (referred to also as the subscriber key) may map to the same ICS file.

After operation 432 and/or 434, the process 400 for creating a calendar is completed.

However, optionally the subscribers can be notified that the calendar described above has been created. In the above description, no events are yet scheduled. The notification to subscribers may be by transmitting an email with the URL for the calendar. In some embodiments, when the subscribers ICS client receives and adds the calendar to the subscribers calendar, the ICS client may periodically access the URL for updates to the calendar. The periodicity of the check may be configurable. For example, in some embodiments, the enterprise web application 404 may transmit to the client a configurable repetition interval.

Description of FIG. 5

FIG. 5 illustrates a GUI interface displayed on a client device (e.g., by a browser running on client device 104) for enabling the user of the client device to adjust settings for event sharing. The configurable settings may include whether or not to synchronize future events, whether or not to synchronize past events, how many months of events are to be synchronized for past events, how many months of events to be synchronized for future events, whether or not to restrict events to specific participants (e.g., a default setting may be to not restrict), whether or not to include public events to which the user has subscribed, and whether or not to include public events to which the user may not have subscribed but which the user receives from other users are to be shared. If sharing of the public events from other users is permitted, such public events to be shared may be filtered based on the other user's identifier and/or the type of event. An example set of settings is illustrated in FIG. 3.

Description of FIG. 6

FIG. 6 illustrates a GUI that may be displayed on the client device in order to enable the user to enter subscriber information for the calendar. The GUI may present a list of subscribers, and the user may enable or disable each subscriber for sharing the calendar. Each subscriber may be identified by the email address, and optionally a custom URL can be provided to some subscribers for purposes of accessing the calendar. Also some of the subscribers may be required to go through a password verification process at some intervals in order to access the calendar. The GUI may allow the user to configure a password for subscribers that would require a password for accessing the calendar. Some of the subscriber settings were illustrated in relation to FIG. 3 above.

Description of FIG. 7

FIG. 7 is a flowchart illustrating a process 700 the updating of sharing settings of a shared calendar such as that created by process 400 described above, according to some example embodiments. Example message interactions between client device 402, enterprise web application 404, configuration server 410 and DBMS 412 are shown. The client device 402 may, in some example embodiments, correspond to client device 104 or 106 shown in FIG. 1. The event-related functionality of the enterprise web application 404 and configuration server 410 may be provided, according to some embodiments, by the enterprise web application 112, core services 114, and event server 134 shown in FIG. 1. The DBMS 412 may represent DBMS 110 shown in FIG. 1 and other storage memory in server 102.

At operation 722, the user provides input selecting one calendar for purposes of changing its sharing settings. For example, the enterprise web application may identify all shareable calendars owned by the user (e.g., based upon the user identifier) and display a list from which the user can make the selection. The listing of calendar names may be based on the names in respective calendar settings files 210.

At operations 724 and 725, in response to receiving the user input, the enterprise web application identifies that requested calendar, and obtains the settings file (e.g., a file 210) and an event file (e.g., a file 202).

At operations 726 and 728, the calendar configuration and/or settings, and subscribers can be modified as desired by the user. Interfaces as described in relation to FIGS. 5 and 6 can be used for changing the settings and/or subscribers.

At operation 730, a new URL is generated for the calendar. An example format of the calendar URL was described above in relation to FIG. 4.

At operations 732 and 734, in a manner similar to 432 and 434, the updated setting for the calendar are saved, for example, by storing the settings in a configuration server and/or DBMS, and optionally the files can be saved in the DBMS.

As with respect to the flowchart of FIG. 4, in FIG. 7 too, only a single interaction of the user with the enterprise web application is specifically illustrated. However, a person of skill in the art would understand that the subsequent processing between operations 722 and 734 may require additional interactions with the user.

In another example usage scenario, if, instead of changing settings, the user deletes the selected calendar (e.g., after selecting a calendar at operation 722, the user indicates that the selected calendar is to be deleted), the system deletes the calendar settings, by marking the settings for deletion. In some embodiments the deletion is conveyed to clients by publishing calendars which are empty (i.e., calendars without any events) or in which the events are marked for deletion, and then synchronizing the published calendars with ICS clients (e.g., client 108, also client 104-106).

Description of FIG. 8

FIG. 8 is a flowchart illustrating a process 800 for the creation or update of an event for an already created calendar, according to some example embodiments. The flowchart illustrates, for example, the creation of a non-public event (e.g., event within the enterprise web application). Example message interactions between client device 402, enterprise web application 404, scheduled event synchronizer 408, configuration server 410 and DBMS 412 are shown. The client device 402 may, in some example embodiments, correspond to client device 104 or 106 shown in FIG. 1. The event-related functionality of the enterprise web application 404, scheduled event synchronizer 408, and configuration server 410 may be provided, according to some embodiments, by the enterprise web application 112, core services 114, and event server 134 shown in FIG. 1. The DBMS 412 may represent DBMS 110 shown in FIG. 1 and other storage memory in server 102.

At operation 822, the client device 402 initiates creation of an event in the enterprise web application. The event creation may be initiated by selecting a button or menu option etc. from an interface displayed on a browser. Prior to the initiation, the user may have been properly authenticated and logged in to the enterprise web application. For example, in some embodiments, the user on client device 104 may be authenticated by the core services 114 for accessing applications hosted by server 102 including enterprise web application 112.

Creating the event may include selecting a date and a time, an event title and/or description, and selecting subscribers to the event. Each event may also be assigned a type. For example, as noted above, each event may be classified as non-public event or a public event. As noted above, non-public events may be accessible only to users of the web application within the enterprise, whereas public events may be open to persons outside of the enterprise. For example, in IR Insight, the non-public events may be investor calls and the like that are restricted to authorized users of IR Insight, and public events such as public announcements such as corporate earnings calls may, in addition to IR Insight users, be open to users who are not IR Insight users.

At operation 824, the created non-public event is stored by the enterprise web applications. The event may be stored in a local or remote memory accessible to the server. The event may be stored in association with its type (e.g., public or private) and its publisher (e.g. user id of user creating the event). According to some embodiments, the created event may be stored in the enterprise web application events file 202 shown in FIG. 2.

At operation 826, a scheduled job 408, makes a periodic (e.g., every 30 minutes) query from the enterprise web application. The enterprise web application on the server may have a separate scheduled job, or periodic process, that queries the enterprise web application for changes in events. The periodicity of the process may be configurable, and can be adjusted in accordance with various criteria such as, for example, day, time of days, etc. The enterprise web application may 404 may maintain a temporary file that keep tracks of the changes to events and/or calendars in between any updates by the scheduled job 408. The scheduled job 408 is then notified (not separately shown) of the changed events by the enterprise web application 404. The notification may be of the form of a list of event ids that have associated event changes. According to some example embodiments, the notification provided is for all users. Some example embodiments, may provide for supplying notifications for events published by a particular user or group of particular users.

At operation 830, the scheduled job 408 acquires ICS settings information from the configuration server 410. The ICS settings may be obtained for each user who has at least one published event in the list of changed events.

At operation 834, each of the changed events is processed in accordance with the corresponding publishing user's ICS settings. For some events, the ICS settings may indicate that no sharing is required. In such a case, no further processing may be required for that event. On the other hand, if the ICS settings indicate that the event is to be shared, at operation 838, the JSON files for the calendar for the corresponding event is obtained.

At operation 842, for each of the events for which the corresponding JSON files were obtained, the corresponding ICS file is obtained.

At operation 846, the JSON files are updated to incorporate the changed event. If the change pertains to a newly added event and the ICS settings indicate that the event is to be shared, that event is added to the appropriate JSON file. The appropriate JSON file is selected based upon the event type. The information stored in a JSON file for a particular event may include, in addition to the event information, relevant ICS setting information.

For example, in some embodiments, in association with the particular event, one or more subscribers to the event may be identified in the JSON file. Additional information such as a publisher-specified event URL may be included in the JSON file.

It should be noted that the events included in the JSON files are filtered from the events in the enterprise web application and events from the public event sources based upon the filter settings (e.g., duration for syncing past/future events) for the calendar.

At operation 848, the ICS file is updated to include the changed event. The ICS file is written with the changed event information in the standard format required for sharing with other event clients. The event information included in the ICS file may include one or more, or all, of event title, date and time, and the URL.

At operation 850, the updated JSON files are stored.

At operation 852, the updated ICS files are stored.

Optionally at operation 854 the subscribers can be notified that the calendar described above has been updated. The notification to subscribers may be by transmitting an email with the URL for the calendar. In some embodiments, when the subscribers ICS client receives and adds the calendar to the subscriber's calendar, the ICS client may periodically access the URL for updates to the calendar. The periodicity of the check may be configurable. For example, in some embodiments, the enterprise web application 404 may transmit to the client a configurable repetition interval. The process 800 may complete after operation 852 or 854.

Description of FIG. 9

FIG. 9 is a flowchart illustrating a process 900 for the deletion of an event, according to some example embodiments. The flowchart illustrates, for example, the deletion of a public event. Example message interactions between client device 402, enterprise web application 404, on-demand event synchronizer 406, configuration server 410 and DBMS 412 are shown. The client device 402 may, in some example embodiments, correspond to client device 104 or 106 shown in FIG. 1. The event-related functionality of the enterprise web application 404, on-demand event synchronizer 406, and configuration server 410 may be provided, according to some embodiments, by the enterprise web application 112, core services 114, and event server 134 shown in FIG. 1. The DBMS 412 may represent DBMS 110 shown in FIG. 1 and other storage memory in server 102.

At operation 922, the client device 402 initiates deletion of an event in the enterprise web application. The event deletion may be initiated by selecting a button or menu option etc. from an interface displayed on a browser. Prior to the initiation, the user may have been properly authenticated and logged in to the enterprise web application. For example, in some embodiments, the user on client device 104 may be authenticated by the core services 114 for accessing applications hosted by server 102 including enterprise web application 112.

At operation 924, the selected event is deleted in the enterprise web application.

At operation 926, the client device is informed of the success of the deletion.

At operation 928, an on-demand event synchronizer 406 is triggered in the server in response to a message from the client device, or being informed by the enterprise web application that a deletion has occurred.

At operation 930, the on-demand job 406 acquires ICS settings information from the configuration server 410. The ICS settings may be obtained for each user who has at least one published event in the list of changed events.

At operation 934, each of the changed calendars is processed in accordance with the respective publisher's ICS settings. For some calendars, the ICS settings may indicate that no sharing is required. In such a case, no further processing may be required for that calendar. On the other hand, if the ICS settings indicate that the calendar is to be shared, the JSON files for the calendar is obtained.

At operation 938, for each of the calendars for which the corresponding JSON files were obtained, the corresponding ICS file is obtained.

At operation 942, the JSON files are updated to incorporate the deleted event. If the change pertains to a newly deleted event and the ICS settings indicate that the calendar is to be shared, that event is deleted from the appropriate JSON file. The appropriate JSON file is selected based upon the event type. The information stored in a JSON file for a particular event may include, in addition to the event information, relevant ICS setting information.

For example, in some embodiments, in association with the particular deleted event, one or more subscribers to the corresponding calendar may be identified in the JSON file. Additional information such as a publisher-specified event URL may be included in the JSON file.

At operation 944, the ICS file is updated to include the deleted event. The ICS file is written with the deleted event information in the standard format required for sharing with other event clients. The event information included in the ICS file may include one or more, or all, of event title, date and time, and the URL.

At operation 946, the updated JSON files are stored.

At operation 948, the updated ICS files are stored.

However, optionally at operation 950, the subscribers can be notified that the calendar described above has been created. In the above description, no events are yet scheduled. The notification to subscribers may be by transmitting an email with the URL for the calendar. In some embodiments, when the subscribers ICS client receives and adds the calendar to the subscriber's calendar, the ICS client may periodically access the URL for updates to the calendar. The periodicity of the check may be configurable. For example, in some embodiments, the enterprise web application 404 may transmit to the client a configurable repetition interval. Process 900 may be complete after operations 948 and 950.

Description of FIG. 10

FIG. 10 is a flowchart 1000 illustrating the changing of settings of an event, according to some example embodiments. Flowchart illustrates a process 1000 for causing synchronization of events subsequent to a change of sharing settings. Example message interactions between client device 402, enterprise web application 404, on-demand event synchronizer 406, configuration server 410 and DBMS 412 are shown. The client device 402 may, in some example embodiments, correspond to client device 104 or 106 shown in FIG. 1. The event-related functionality of the enterprise web application 404, on-demand event synchronizer 406, and configuration server 410 may be provided, according to some embodiments, by the enterprise web application 112, core services 114, and event server 134 shown in FIG. 1. The DBMS 412 may represent DBMS 110 shown in FIG. 1 and other storage memory in server 102.

At operation 1022, the client device 402 operated by a user performs the changing of settings associated with a particular calendar of the user. The changing is performed by a browser in client device 402 interacting with the enterprise web application on a server. For example, in some embodiments, the user on client device 104 may be authenticated by the core services 114 for accessing applications hosted by server 102 including enterprise web application 112.

At operation 1024, the updated settings are saved by the enterprise web application. The updated settings are stored in the configuration server and/or the DBMS.

At operation 1026, an on-demand event synchronizer 406 is triggered in the server in response to a message from the enterprise web application that a change of settings has occurred.

At operation 1028, the on-demand job 406 acquires ICS settings information from the configuration server 410. The ICS settings may be obtained for each user who has at least one published event in the list of changed events.

At operation 1032, each of the changed calendars is processed in accordance with the respective publisher's ICS settings. For some calendars, the ICS settings may indicate that no sharing is required. In such a case, no further processing may be required for that calendar. On the other hand, if the ICS settings indicate that the calendar is to be shared, the JSON files for the calendar is obtained.

At operation 1036, for each of the calendars for which the corresponding JSON files were obtained, the corresponding ICS file is obtained.

At operation 1040, the JSON files are updated to incorporate the deleted event. If the change pertains to a newly deleted event and the ICS settings indicate that the calendar is to be shared, that event is deleted from the appropriate JSON file. The appropriate JSON file is selected based upon the event type. The information stored in a JSON file for a particular event may include, in addition to the event information, relevant ICS setting information.

For example, in some embodiments, in association with the particular deleted event, one or more subscribers to the corresponding calendar may be identified in the JSON file. Additional information such as a publisher-specified event URL may be included in the JSON file.

At operation 1042, the ICS file is updated to include the deleted event. The ICS file is written with the deleted event information in the standard format required for sharing with other event clients. The event information included in the ICS file may include one or more, or all, of event title, date and time, and the URL.

At operation 1044, the updated JSON files are stored.

At operation 1046, the updated ICS files are stored, and the process 1000 is completed.

Description of FIG. 11

FIG. 11 is a flowchart illustrating a process 1100 for the scheduled update of calendars, according to some example embodiments. Example message interactions between enterprise web application 404, scheduled event synchronizer 408, configuration server 410 and DBMS 412 are shown. The event-related functionality of the enterprise web application 404, scheduled event synchronizer 408, and configuration server 410 may be provided, according to some embodiments, by the enterprise web application 112, core services 114, and event server 134 shown in FIG. 1. The DBMS 412 may represent DBMS 110 shown in FIG. 1 and other storage memory in server 102.

At operation 1124, a scheduled job 408, makes a periodic query from the enterprise web application. The enterprise web application on the server may have a separate scheduled job, or periodic process, that queries the enterprise web application for changes in events. In response to operation 1126, the enterprise web application notifies the scheduled job 408 as to whether there have been any changes. The notification may be of the form of a list of event ids that have associated event changes. According to some example embodiments, the notification provided is for all users. Some example embodiments, may provide for supplying notifications for events published by a particular user or group of particular users.

At operation 1128, the scheduled job 408 acquires ICS settings information from the configuration server 410. The ICS settings may be obtained for each user who has at least one published event in the list of changed events.

At operation 1134, the changed events are obtained from the enterprise web application 404 by the scheduled event synchronizer 408.

Each of the changed events is processed by operations 1138-1152 in accordance with the respective publisher's ICS settings. For some events, the ICS settings may indicate that no sharing is required. In such a case, no further processing may be required for that event. On the other hand, if the ICS settings indicate that the event is to be shared, the JSON files for the event is obtained at operation 1138. For example, the JSON file for the non-public events and the JSON file for the public events may both be obtained.

At operation 1142 the corresponding ICS file is obtained.

At operation 1146, the JSON files are updated to incorporate the changed event. If the change pertains to a newly added event and the ICS settings indicate that the event is to be shared, that event is added to the appropriate JSON file. The appropriate JSON file is selected based upon the event type. The information stored in a JSON file for a particular event may include, in addition to the event information, relevant ICS setting information. For example, in some embodiments, in association with the particular event, one or more subscribers to the event may be identified in the JSON file. Additional information such as a publisher-specified event URL may be included in the JSON file.

At operation 1148, the ICS file is updated to include the changed event. The ICS file is written with the changed event information in the standard format required for sharing with other event clients. The event information included in the ICS file may include one or more, or all, of event title, date and time, and the URL.

At operation 1150, the updated JSON files are stored.

At operation 1152, the updated ICS files are stored, and process 1100 is completed.

However, optionally at operation 1154, the subscribers can be notified that the calendar described above has been created. In the above description, no events are yet scheduled. The notification to subscribers may be by transmitting an email with the URL for the calendar. In some embodiments, when the subscribers ICS client receives and adds the calendar to the subscribers calendar, the ICS client may periodically access the URL for updates to the calendar. The periodicity of the check may be configurable. For example, in some embodiments, the enterprise web application 404 may transmit to the client a configurable repetition interval. Process 1100 may be complete after operations 1152 and 1154.

Description of FIG. 12

FIG. 12 is a flowchart illustrating a process 1200 for a client to access a shared internet calendar, according to some example embodiments. Example interactions between a client 1202, enterprise web application 404 and DBMS 412 are shown. The client 1202 may correspond, in some example embodiments, to client 108 shown in FIG. 1. Enterprise web application 404 may correspond to the enterprise web application 112 and event server 116 in FIG. 1, and DBMS 412 may correspond to DBMS 110 and other memory of server 102.

Process 1200 may begin when, at operation 1222, a client 1202 receives a calendar sharing message. For example, a client device such as, client 104 or 108 (e.g., an enterprise client or non-enterprise client) in FIG. 1, may receive a message including a URL to an internet calendar. The URL may be specified in the Webcals format, and the internet calendar may be according to the iCalendar format with an .ics file extension. The message may be transmitted by the enterprise web application, being executed on the server (e.g., server infrastructure 102) upon a new calendar being created for sharing, new event being added to a calendar, settings of a calendar being affected, or other change to a calendar or event.

At operation 1224, the client requests access to the calendar, and specifies the calendar key and the subscriber key. The keys may have been specified in the Webcals message, and the request for access may be initiated upon the user clicking on the received Webcals URL.

At operation 1226, upon receiving the request for access, the enterprise web application queries a configuration server to verify, at operation 1228, the validity of the keys sent with the request. The verification includes identifying the requested calendar.

As noted above in relation to FIG. 6, some embodiments enable specifying for a per user basis, whether authentication is required.

If it is determined that authentication is required, then at operations 1232, the enterprise web application and/or its configuration server transmits a request for authentication information. In return, at operation 1234, the user credentials for authentication are provided from the client to the enterprise web application and/or its configuration server.

At operation 1236, the user is authenticated based on the received credentials. If the authentication failed, process 1200 may be exited without providing the requested calendar.

After authentication, the enterprise web application and/or its configuration server gets the calendar file (e.g., the corresponding ICS file) from the DBMS 412.

At operation 1242, the requested calendar file is downloaded to the client.

At operation 1244 the obtained calendar is displayed. Process 1200 completes after operation 1244.

Alternatively, if it is indicated that no authentication is required, then the enterprise web application and/or its configuration server returns the calendar file without requesting the user for authentication.

Description of FIG. 13

FIG. 13 is a flowchart illustrating a process 1300 in which the interaction between the client and the server is protected using Security Assertion Markup Language (SAML). More specifically, on the client device, a proxy agent for shared calendar life cycle management is installed after which communications of the ICS client to/from the server is through the proxy. Example message interactions between client device 402, enterprise web application 404 and DBMS 412 are shown. Client device 402, according to some embodiments may correspond to client 108 shown in FIG. 1, and the ICS client 401 may correspond to other event application client 128. The enterprise web application 404 may correspond, in example embodiments, to the enterprise web application 112, core services 114 and event server 116. DBMS 412 may correspond to DBMS 110 and other memory storage in server 102.

The proxy enables SAML protection of calendar data being exchanged. SAML offers a higher level of protection than that provided by the basic or digest authentication offered by the standard ICS clients. The proxy approach in some example embodiments enable at least some users accessing the shared calendars through ICS clients to avail themselves of the higher level of security offered by the higher level of authentication offered by the server infrastructure (e.g., server infrastructure 102 and authentication by core services 114).

In this example embodiment, a user installs a proxy agent on the desktop or mobile computer client on which the ICS client is executed. The proxy agent creates a SAML-authenticated connection to the server where the enterprise web application executes, and subsequently the ICS client connects to the proxy agent for its communications with the enterprise web application for event management.

At operation 1322, the user, using an ICS client, clicks on a received shared calendar link. The link may have been received out of band, such as, via email.

At operation 1324, the ICS client requests access to the calendar, and specifies the calendar key and the subscriber key. The keys may have been specified in the Webcals message, and the request for access may be initiated upon the user clicking on the received Webcals URL. The client request is made in an ICS client executing in the client device.

The ICS client is configured to communicate through the proxy. Thus, the installed proxy intercepts the ICS client's request to access the shared calendar and, at operation 1326, transmits the request, over the SAML-protected link to the server or enterprise web application running on the server.

At operation 1328, upon receiving the request for access, the enterprise web application verifies, in operations 1328-1330, the validity of the keys sent with the request. The verification includes identifying the requested calendar based on the specified calendar key and subscriber key.

At operation 1328, the enterprise web application recognizes that the request was received over an SAML-protected link, and thus no further authentication of the user is required. Thus, even if the calendar configuration settings are set to obtain authentication, such settings can be ignored when the request is received over an SAML-protected link.

At operations 1332-1334, the enterprise web application and/or its configuration server requests and receives the calendar file (e.g., the corresponding ICS file) from the DBMS.

At operation 1336, the requested ICS file is downloaded to the client.

At operation 1338 the obtained ICS file is used to update the local calendar, and the updated calendar is displayed. Process 1300 completes after operation 1338.

Description of FIG. 14

FIG. 14 is a block diagram of an example computing device 1400 (which may also be referred to, for example, as a "computing device," "computer system," or "computing system") according to some embodiments. In some embodiments, the computing device 1400 includes one or more of the following: one or more processors 1402; one or more memory devices 1404; one or more network interface devices 1406; one or more display interfaces 1408; and one or more user input adapters 1410. Additionally, in some embodiments, the computing device 1400 is connected to or includes a display device 1412. As will explained below, these elements (e.g., the processors 1402, memory devices 1404, network interface devices 1406, display interfaces 1408, user input adapters 1410, display device 1412) are hardware devices (for example, electronic circuits or combinations of circuits) that are configured to perform various different functions for the computing device 1400.

In some embodiments, each or any of the processors 1402 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1402 uses an instruction set architecture such as x86 or Advanced RISC Machine (ARM).

In some embodiments, each or any of the memory devices 1404 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1402). Memory devices 1404 are examples of non-volatile computer-readable storage media.

In some embodiments, each or any of the network interface devices 1406 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1408 is or includes one or more circuits that receive data from the processors 1402, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1412, which displays the image data. Alternatively or additionally, in some embodiments, each or any of the display interfaces 1408 is or includes, for example, a video card, video adapter, or graphics processing unit (GPU).

In some embodiments, each or any of the user input adapters 1410 is or includes one or more circuits that receive and process user input data from one or more user input devices (not shown in FIG. 14) that are included in, attached to, or otherwise in communication with the computing device 1400, and that output data based on the received input data to the processors 1402. Alternatively or additionally, in some embodiments each or any of the user input adapters 1410 is or includes, for example, a PS/2 interface, a USB interface, a touchscreen controller, or the like; and/or the user input adapters 1410 facilitates input from user input devices (not shown in FIG. 14) such as, for example, a keyboard, mouse, trackpad, touchscreen, etc.

In some embodiments, the display device 1412 may be a Liquid Crystal Display (LCD) display, Light Emitting Diode (LED) display, or other type of display device. In embodiments where the display device 1412 is a component of the computing device 1400 (e.g., the computing device and the display device are included in a unified housing), the display device 1412 may be a touchscreen display or non-touchscreen display. In embodiments where the display device 1412 is connected to the computing device 1400 (e.g., is external to the computing device 1400 and communicates with the computing device 1400 via a wire and/or via wireless communication technology), the display device 1412 is, for example, an external monitor, projector, television, display screen, etc.

In various embodiments, the computing device 1400 includes one, or two, or three, four, or more of each or any of the above-mentioned elements (e.g., the processors 1402, memory devices 1404, network interface devices 1406, display interfaces 1408, and user input adapters 1410).

Alternatively or additionally, in some embodiments, the computing device 1400 includes one or more of: a processing system that includes the processors 1402; a memory or storage system that includes the memory devices 1404; and a network interface system that includes the network interface devices 1406.

The computing device 1400 may be arranged, in various embodiments, in many different ways. As just one example, the computing device 1400 may be arranged such that the processors 1402 include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 1400 may be arranged such that: the processors 1402 include two, three, four, five, or more multi-core processors; the network interface devices 1406 include a first network interface device that implements Ethernet and a second network interface device that implements WiFi and/or Bluetooth; and the memory devices 1404 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the client device 104, client device 106, client device 108, client device 402, and server 102 each of which will be referred to individually for clarity as a "component" for the remainder of this paragraph, are implemented using an example of the computing device 1400 of FIG. 14. In such embodiments, the following applies for each component: (a) the elements of the 1400 computing device 1400 shown in FIG. 14 (i.e., the one or more processors 1402, one or more memory devices 1404, one or more network interface devices 1406, one or more display interfaces 1408, and one or more user input adapters 1410), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1404 (e.g., in various embodiments, in a volatile memory device such as a RAM or an instruction register and/or in a non-volatile memory device such as a flash memory or hard disk) and all actions described herein as performed by the software modules are performed by the processors 1402 in conjunction with, as appropriate, the other elements in and/or connected to the computing device 1400 (i.e., the network interface devices 1406, display interfaces 1408, user input adapters 1410, and/or display device 1412); (c) alternatively or additionally, to the extent it is described herein that the component processes and/or otherwise handles data, in some embodiments, such data is stored in the memory devices 1404 (e.g., in some embodiments, in a volatile memory device such as a RAM and/or in a non-volatile memory device such as a flash memory or hard disk) and/or is processed/handled by the processors 1402 in conjunction, as appropriate, the other elements in and/or connected to the computing device 1400 (i.e., the network interface devices 1406, display interfaces 1408, user input adapters 1410, and/or display device 512); (d) alternatively or additionally, in some embodiments, the memory devices 1402 store instructions that, when executed by the processors 1402, cause the processors 1402 to perform, in conjunction with, as appropriate, the other elements in and/or connected to the computing device 1400 (i.e., the memory devices 1404, network interface devices 1406, display interfaces 1408, user input adapters 1410, and/or display device 512), each or any combination of actions described herein as performed by the component and/or by any software modules described herein as included within the component.

Consistent with the preceding paragraph, as one example, in an embodiment where an instance of the computing device 1400 is used to implement the client device 104, the memory devices 1404 could load the files associated with the SPA (e.g., HTML, XML, JavaScript files), and/or store the data described herein as processed and/or otherwise handled by the web browser application 126 and/or the client device 104. Processors 1402 could be used to operate the processing modules, and/or otherwise process the data described herein as processed by the web browser 126 and/or the client device 104. In another example, an instance of the computing device 1400 is used to implement the client device 108, the memory devices 1404 could load the files associated with the event application client 134, and/or store the data described herein as processed and/or otherwise handled by the event application client 134 and/or the client device 108. Processors 1402 could be used to operate the processing modules, and/or otherwise process the data described herein as processed by the web browser 134 and/or the client device 108. In another example, an instance of the computing device 1400 is used to implement the server infrastructure 102, the memory devices 1404 could load the files associated with the enterprise web application 112, core services 114, event services 116 and DBMS 110, and/or store the data described herein as processed and/or otherwise handled by the enterprise web application 112, core services 114, event services 116, and/or the server 102. Processors 1402 could be used to operate the processing modules, and/or otherwise process the data described herein as processed by the web browser 126 and/or the client device 104.

The hardware configurations shown in FIG. 14 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 14, (e) via other hardware arrangements, architectures, and configurations, and/or via combinations of the technology described in (a) through (e).

Technical Advantages of Described Subject Matter

In certain example embodiments, the events scheduled in an enterprise web application are presented together with event schedules from external event scheduling sources in a consolidated calendar. The consolidated calendar improves the efficiency and speed with which the computer systems can provide users with a view to their schedules, integrating multiple event sources. Certain example embodiments also provide for sharing enterprise events and non-enterprise events with users on multiple different platforms including users who are not logged in, or are unable to login, to the enterprise web application, thus improving the accessibility to the schedule information. Certain example embodiments provide for filtering of events that are to be shared based on length of time from current time, lists of subscribers, whether or not to share events from particular event sources, event type etc. Certain embodiments, also enable the publisher of a calendar to further control who has access to the event schedules by requiring selected subscribers to provide authentication, by enabling/disabling a customized URL provided to a user for accessing a calendar, etc. Embodiments also provide for improved efficiency of event synchronization by providing for synchronizing the different event sources based upon different criteria (e.g., separate files accessed differently, filtering criteria, etc.). Still further, some example embodiments provide for improved security of the event sharing messages being exchanged between an enterprise server and client devices. Further technical advantages that are not specifically noted above may be provided in the embodiments.

The technical features described herein may thus improve the availability of electronically maintained event schedules to subscribers, the security of such schedules, and the speed and efficiency with which such schedules can be accessed.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 4, 7-13, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A method performed by at least one processor to electronically schedule events, the method comprising:
    generating, by the at least one processor, a consolidated calendar data structure including the first events of a first event type and second events of a second event type, the consolidated calendar data structure being displayed on a client accessing the first application,
    wherein the first events are created by a first application based on inputs received from a user interface, the inputs including at least dates and times associated with each of the first events,
    and wherein the second events of a second event type are from an event source external to the first application;
    generating, by the at least one processor, a calendar file based on a first file accessible by the first application and having the created first events stored therein and a second file accessible by the first application and having the obtained second events stored therein, wherein the second file is different from the first file;
    querying, by the at least one processor, the first application for changes in one or more of the first events effected by further inputs received from the user interface, the further inputs including at least a date or a time associated with each of the one or more of the first events:

for each changed event of the first event type, obtaining, by the at least one processor, stored event data of the event of the first event type;

updating, by the at least one processor and in accordance with each of the changed events, the consolidated calendar data structure, the calendar file, the first file and the second file.

2. The method according to claim 1, further comprising: in response to receiving a request for the calendar file over a network connection and determining that the request is for the calendar file, transmitting at least a portion of the calendar file.

3. The method according to claim 2, further comprising, in response to the determining that the request is for the calendar file and before the transmitting, authenticating a sender of the request, wherein the sender is identified as a subscriber to the calendar in preconfigured sharing configuration information.

4. The method according to claim 2, wherein the request includes an identifier that is an obfuscated string representing the calendar file.

5. The method according to claim 4, wherein a second request includes an identifier that is a second obfuscated string representing the calendar file, the second obfuscated string having been previously provided to a third user, the third user being different from a first user logged into the first application and a second user who is not logged in to the first application and accessing at least portions of first information comprising the first events and portions of second information comprising the second events accessible, based on the calendar file via an event client application.

6. The method according to claim 5, further comprising, disabling access to the calendar file for the second user by deleting the second user's association with the calendar file as a subscriber or by expiring access to the calendar file using the obfuscated string previously provided to the second user.

7. The method according to claim 2, wherein the request includes a URL comprising a first identifier corresponding to the calendar file and a second identifier corresponding to a first user logged into the first application.

8. The method according to claim 7, wherein another request includes a URL comprising a third identifier corresponding to the calendar file and a second identifier corresponding to the first user, wherein the first identifier and the third identifier are previously configured as corresponding to the calendar file.

9. The method according to claim 8, wherein each of the first identifier and the second identifier is assigned to a respective user.

10. The method according to claim 2, further comprising:
configuring a secure connection with a proxy client on a client device of a user; and
performing said transmitting, by transmitting the at least a portion of the calendar file over the secure connection, wherein the proxy client processes the secured at least a portion of the calendar file and sends to the user who initiated sending the URL.

11. The method according to claim 10, wherein the secure connection is a SAML connection.

12. The method according to claim 1, further comprising configuring, by accessing a configuration interface in the first application, one or more event sharing parameters for use in determining events to be shared from a consolidated calendar data structure that includes the first events and the second events.

13. The method according to claim 1, further comprises generating the calendar file, wherein the generating comprises filtering at least one of the first events and the second events according to one or more sharing configuration parameters, and wherein the filtered at least one of the first events and the second events are stored as the first information and/or the second information.

14. The method according to claim 13, wherein the sharing configuration parameters include one or more of a maximum past event duration parameter to control a maximum length of time for which events are filtered to first information comprising the first events and second information comprising the second events, and a maximum future event duration parameter to control a maximum length of time for which events are filtered to the first information and the second information.

15. The method according to claim 13, wherein the sharing configuration parameters include a parameter to control whether said second events from the external source are written to the second information.

16. The method according to claim 13, wherein the sharing configuration parameters include a parameter to control whether said second events from a second external source are written to the second information.

17. The method according to claim 1, wherein preconfigured information for the calendar file includes an update interval for a client to obtain updates about the calendar file.

18. The method according to claim 2, wherein the first file and the second file include data in a JSON format, and the calendar is of an ICS file format.

19. A computer system comprising:
one or more network interface devices;
at least one memory; and
at least one processor,
wherein the at least one processor is configured to perform operations comprising:
generating, by the at least one processor, a consolidated calendar data structure including the first events of a first event type and second events of a second event type, the consolidated calendar data structure being displayed on a client accessing the first application, wherein the first events are created by a first application based on inputs received from a user interface, the inputs including at least dates and times associated with each of the first events, and wherein the second events of a second event type are from an event source external to the first application;
generating, by the at least one processor, a calendar file based on a first file accessible by the first application and having the created first events stored therein and a second file accessible by the first application and having the obtained second events stored therein, wherein the second file is different from the first file;
querying, by the at least one processor, the first application for changes in one or more of the first events effected by further inputs received from the user interface, the further inputs including at least a date or a time associated with each of the one or more of the first events;
for each changed event of the first event type, obtaining, by the at least one processor, stored event data of the event of the first event type;
updating, by the at least one processor and in accordance with each of the changed events, the consolidated calendar data structure, the calendar file, the first file and the second file.

20. A non-transitory computer-readable storage medium having stored therein instructions which, when executed by a processor of a computer, causes the computer to perform operations comprising:

generating, by the at least one processor, a consolidated calendar data structure including the first events of a first event type and second events of a second event type, the consolidated calendar data structure being displayed on a client accessing the first application, wherein the first events are created by a first application based on inputs received from a user interface, the inputs including at least dates and times associated with each of the first events, and wherein the second events of a second event type are from an event source external to the first application;

generating, by the at least one processor, a calendar file based on a first file accessible by the first application and having the created first events stored therein and a second file accessible by the first application and having the obtained second events stored therein, wherein the second file is different from the first file;

querying, by the at least one processor, the first application for changes in one or more of the first events effected by further inputs received from the user interface, the further inputs including at least a date or a time associated with each of the one or more of the first events;

for each changed event of the first event type, obtaining, by the at least one processor, stored event data of the event of the first event type;

updating, by the at least one processor and in accordance with each of the changed events, the consolidated calendar data structure, the calendar file, the first file and the second file.

\* \* \* \* \*